(12) United States Patent
Llop et al.

(10) Patent No.: US 12,098,313 B2
(45) Date of Patent: Sep. 24, 2024

(54) LOW COEFFICIENT OF FRICTION LAMINATES

(71) Applicant: Dow Global Technologies LLC, Midland, MI (US)

(72) Inventors: Cosme Llop, Tarragona (ES); Owendi Ongayi, Tarragona (ES); Marco Amici, Horgen (CH); Patrick Prele, Saint Laurent du Pont (FR); Celine Chevallier, Saint Laurent du Pont (FR)

(73) Assignee: Dow Global Technologies LLC, Midland, MI (US)

( * ) Notice: Subject to any disclaimer, the term of this patent is extended or adjusted under 35 U.S.C. 154(b) by 345 days.

(21) Appl. No.: 16/620,343

(22) PCT Filed: Jun. 4, 2018

(86) PCT No.: PCT/US2018/035871
§ 371 (c)(1),
(2) Date: Dec. 6, 2019

(87) PCT Pub. No.: WO2018/226591
PCT Pub. Date: Dec. 13, 2018

(65) Prior Publication Data
US 2021/0147724 A1   May 20, 2021

(30) Foreign Application Priority Data
Jun. 9, 2017 (EP) .................................. 17382354

(51) Int. Cl.
| | | |
|---|---|---|
| *B32B 27/08* | (2006.01) | |
| *B32B 7/06* | (2019.01) | |
| *B32B 7/12* | (2006.01) | |
| *B32B 27/30* | (2006.01) | |
| *B32B 27/32* | (2006.01) | |
| *B32B 27/34* | (2006.01) | |
| *B32B 27/36* | (2006.01) | |
| *C09J 7/38* | (2018.01) | |
| *C09J 7/40* | (2018.01) | |
| *B32B 27/28* | (2006.01) | |
| *C09J 7/24* | (2018.01) | |

(52) U.S. Cl.
CPC ................ *C09J 7/405* (2018.01); *B32B 7/06* (2013.01); *B32B 7/12* (2013.01); *B32B 27/08* (2013.01); *B32B 27/306* (2013.01); *B32B 27/32* (2013.01); *B32B 27/34* (2013.01); *B32B 27/36* (2013.01); *C09J 7/38* (2018.01); *C09J 7/401* (2018.01); *B32B 27/283* (2013.01); *B32B 2250/03* (2013.01); *B32B 2250/24* (2013.01); *B32B 2307/748* (2013.01); *B32B 2383/00* (2013.01); *B32B 2405/00* (2013.01); *C09J 7/243* (2018.01); *C09J 2423/045* (2013.01); *C09J 2467/005* (2013.01); *C09J 2467/006* (2013.01); *C09J 2471/00* (2013.01); *C09J 2475/00* (2013.01); *C09J 2483/005* (2013.01); *Y10T 428/31* (2015.01); *Y10T 428/31504* (2015.04); *Y10T 428/31663* (2015.04)

(58) Field of Classification Search
CPC ..... C09J 7/405; C09J 7/38; C09J 7/401; C09J 7/243; C09J 2423/045; C09J 2467/005; C09J 2467/006; C09J 2471/00; C09J 2475/00; C09J 2483/005; B32B 7/06; B32B 7/12; B32B 27/08; B32B 27/306; B32B 27/32; B32B 27/34; B32B 27/36; B32B 27/283; B32B 2405/00; B32B 2255/10; B32B 2255/26; B32B 2270/00; B32B 2274/00; B32B 2307/31; B32B 2307/746; B32B 2439/46; B32B 2439/70; B32B 27/18; B32B 27/308; C08G 77/04; C08L 23/06; C08L 23/08; C08L 2205/035; C08L 23/0815; C09D 183/04
See application file for complete search history.

(56) References Cited

U.S. PATENT DOCUMENTS

| | | | |
|---|---|---|---|
| 4,659,612 A | 4/1987 | Balloni et al. | |
| 5,614,297 A * | 3/1997 | Velazquez | ............... B32B 27/08 428/472 |
| 5,677,383 A | 10/1997 | Chum et al. | |
| 5,972,496 A | 10/1999 | Bader et al. | |
| 6,080,489 A * | 6/2000 | Mehta | ...................... C08L 23/10 428/447 |
| 6,111,023 A | 8/2000 | Chum et al. | |
| 6,280,085 B1 * | 8/2001 | Beer | ....................... B31B 70/00 383/111 |
| 6,984,695 B2 | 1/2006 | Brown et al. | |
| 2004/0112785 A1 * | 6/2004 | Wittemer | ............... B65D 75/30 206/534 |
| 2004/0151934 A1 | 8/2004 | Schwark et al. | |
| 2011/0252745 A1 * | 10/2011 | Breck | ..................... B32B 27/32 53/451 |
| 2012/0144896 A1 | 6/2012 | Pham et al. | |
| 2013/0236612 A1 * | 9/2013 | Deng | .................... B32B 27/304 426/106 |
| 2013/0299373 A1 * | 11/2013 | Johnson | ................. A61B 50/00 428/339 |

OTHER PUBLICATIONS

3M NPL document, retrieved Feb. 4, 2022.*
Determining the Coefficient of Friction (Year: 2005).*

* cited by examiner

Primary Examiner — Michael B Nelson
(74) Attorney, Agent, or Firm — Boyle Fredrickson, S.C.

(57) ABSTRACT

The present disclosure provides a laminate. The laminate includes a first film and a second film, wherein the first film is laminated to the second film. The first film includes a sealant layer containing (A) an ethylene-based polymer; and (B) a slip agent blend containing (i) a first polydimethylsiloxane having a number average molecular weight (Mn) from 30,000 g/mol to less than 300,000 g/mol; and (ii) a second polydimethylsiloxane having a number average molecular weight (Mn) from 300,000 g/mol to 2,000,000 g/mol.

16 Claims, No Drawings

LOW COEFFICIENT OF FRICTION LAMINATES

BACKGROUND

The present disclosure relates to laminates with a film having a sealant layer containing an ethylene-based polymer and a slip agent.

Film layers formed from ethylene-based polymers are used in films in laminates in a variety of applications, including, for example, food packaging and specialty packaging. An ethylene-based polymer outer laminate layer requires a low coefficient of friction (COF) (e.g., less than 0.35) for efficient processing of the laminates, such as in a fabrication line or a packaging line. To achieve a low COF, slip agents are typically added to the ethylene-based polymer outer layer. Conventional slip agents include unsaturated fatty acid amides such as erucamide and oleamide, which are known to lower a laminate's COF by migrating to the surface of the laminate. However, it is difficult to maintain a consistent low COF using conventional migratory slip agents under different environmental conditions, such as time, elevated temperature, elevated pressure, and various converting processes.

The art recognizes the need for a laminate with a film that includes an ethylene-based polymeric composition that may be used in a fast packaging line. The art also recognizes the need for a laminate with a film that includes an ethylene-based polymeric composition that exhibits a low COF (e.g., less than 0.35) without a migratory slip agent.

SUMMARY

The present disclosure provides a laminate. The laminate includes a first film and a second film, wherein the first film is laminated to the second film. The first film includes a sealant layer containing (A) an ethylene-based polymer; and (B) a slip agent blend containing (i) a first polydimethylsiloxane having a number average molecular weight (Mn) from 30,000 g/mol to less than 300,000 g/mol; and (ii) a second polydimethylsiloxane having a number average molecular weight (Mn) from 300,000 g/mol to 2,000,000 g/mol.

DEFINITIONS

Any reference to the Periodic Table of Elements is that as published by CRC Press, Inc., 1990-1991. Reference to a group of elements in this table is by the new notation for numbering groups.

For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value. For ranges containing explicit values (e.g., 1 or 2, or 3 to 5, or 6, or 7), any subrange between any two explicit values is included (e.g., 1 to 2; 2 to 6; 5 to 7; 3 to 7; 5 to 6; etc.).

Unless stated to the contrary, implicit from the context, or customary in the art, all parts and percents are based on weight and all test methods are current as of the filing date of this disclosure.

The term "alkenyl" (or "alkenyl group") refers to an organic radical derived from an aliphatic hydrocarbon by removing one hydrogen atom from an alkene group. A nonlimiting example of an alkenyl group is a vinyl group. A "vinyl group" is a —CH=CH$_2$ group.

"Alkoxy" (or "alkoxy group") refers to the —OZ$^1$ radical, where representative Z$^1$ include alkyl, substituted alkyl, cycloalkyl, substituted cycloalkyl, heterocycloalkyl, substituted heterocycloalkyl, silyl groups and combinations thereof. Nonlimiting examples of suitable alkoxy radicals include methoxy, ethoxy, benzyloxy, and t-butoxy.

The term "alkyl" (or "alkyl group") refers to an organic radical derived from an aliphatic hydrocarbon by removing one hydrogen atom therefrom. An alkyl group may be a linear, branched, cyclic or a combination thereof. The term "substituted alkyl" refers to an alkyl, in which at least one hydrogen atom is substituted with a substituent that comprises at least one heteroatom. Heteroatoms include, but are not limited to, O, N, P and S. Substituents include, but are not limited to, halide, OR', NR'$_2$, PR'$_2$, P(=O)R'$_2$, SiR'$_3$; where each R' is independently a C$_1$-C$_{20}$ hydrocarbyl group.

The term "alkynyl" (or "alkynyl group") refers to an organic radical derived from an aliphatic hydrocarbon by removing one hydrogen atom from an alkyne group.

The term "aryl" (or "aryl group") refers to an organic radical derived from aromatic hydrocarbon by removing one hydrogen atom therefrom. An aryl group may be a monocyclic and/or fused ring system, each ring of which suitably contains from 5 to 7, preferably from 5 or 6 atoms. Structures wherein two or more aryl groups are combined through single bond(s) are also included. Specific examples include, but are not limited to, phenyl, tolyl, naphthyl, biphenyl, anthryl, indenyl, fluorenyl, benzofluorenyl, phenanthryl, triphenylenyl, pyrenyl, perylenyl, chrysenyl, naphtacenyl, fluoranthenyl, and the like. The term "substituted aryl" refers to an aryl, in which at least one hydrogen atom is substituted with a substituent comprising at least one heteroatom. Heteroatoms include, but are not limited to, O, N, P and S. Substituents include, but are not limited to, halide OR', NR'$_2$, PR'$_2$, P(=O)R'$_2$, SiR'$_3$; where each R' is independently a C$_1$-C$_{20}$ hydrocarbyl group.

The terms "blend" or "polymer blend," as used herein, is a blend of two or more polymers. Such a blend may or may not be miscible (not phase separated at molecular level). Such a blend may or may not be phase separated. Such a blend may or may not contain one or more domain configurations, as determined from transmission electron spectroscopy, light scattering, x-ray scattering, and other methods known in the art.

The term "composition" refers to a mixture of materials which comprise the composition, as well as reaction products and decomposition products formed from the materials of the composition.

The terms "comprising," "including," "having" and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

A "cycloalkyl" is a saturated cyclic non-aromatic hydrocarbon radical having a single ring or multiple condensed rings. Nonlimiting examples of suitable cycloalkyl radicals include cyclopentyl, cyclohexyl, cyclooctyl, bicyclooctyl, etc. In particular embodiments, cycloalkyls have between 3 and 200 carbon atoms, between 3 and 50 carbon atoms or between 3 and 20 carbon atoms.

An "ethylene-based polymer" is a polymer that contains more than 50 weight percent polymerized ethylene monomer (based on the total amount of polymerizable monomers) and, optionally, may contain at least one comonomer. Ethylene-based polymer includes ethylene homopolymer, and ethylene copolymer (meaning units derived from ethylene and one or more comonomers). The terms "ethylene-based polymer" and "polyethylene" may be used interchangeably. Nonlimiting examples of ethylene-based polymer (polyethylene) include low density polyethylene (LDPE) and linear polyethylene. Nonlimiting examples of linear polyethylene include linear low density polyethylene (LLDPE), ultra low density polyethylene (ULDPE), very low density polyethylene (VLDPE), multi-component ethylene-based copolymer (EPE), ethylene/α-olefin multi-block copolymers (also known as olefin block copolymer (OBC)), single-site catalyzed linear low density polyethylene (m-LLDPE), substantially linear, or linear, plastomers/elastomers, and high density polyethylene (HDPE). Generally, polyethylene may be produced in gas-phase, fluidized bed reactors, liquid phase slurry process reactors, or liquid phase solution process reactors, using a heterogeneous catalyst system, such as Ziegler-Natta catalyst, a homogeneous catalyst system, comprising Group 4 transition metals and ligand structures such as metallocene, non-metallocene metal-centered, heteroaryl, heterovalent aryloxyether, phosphinimine, and others. Combinations of heterogeneous and/or homogeneous catalysts also may be used in either single reactor or dual reactor configurations.

"Ethylene plastomers/elastomers" are substantially linear, or linear, ethylene/α-olefin copolymers containing homogeneous short-chain branching distribution comprising units derived from ethylene and units derived from at least one $C_3$-$C_{10}$ α-olefin comonomer, or at least one $C_4$-$C_8$ α-olefin comonomer, or at least one $C_6$-$C_8$ α-olefin comonomer. Ethylene plastomers/elastomers have a density from 0.870 g/cc, or 0.880 g/cc, or 0.890 g/cc to 0.900 g/cc, or 0.902 g/cc, or 0.904 g/cc, or 0.909 g/cc, or 0.910 g/cc, or 0.917 g/cc. Nonlimiting examples of ethylene plastomers/elastomers include AFFINITY™ plastomers and elastomers (available from The Dow Chemical Company), EXACT™ Plastomers (available from ExxonMobil Chemical), Tafmer™ (available from Mitsui), Nexlene™ (available from SK Chemicals Co.), and Lucene™ (available LG Chem Ltd.).

A "heteroatom" is an atom other than carbon or hydrogen. Nonlimiting examples of suitable heteroatoms include: F, Cl, Br, N, O, P, B, S, Si, Sb, Al, Sn, As, Se and Ge.

"High density polyethylene" (or "HDPE") is an ethylene homopolymer or an ethylene/α-olefin copolymer with at least one $C_4$-$C_{10}$ α-olefin comonomer, or $C_4$-$C_8$ α-olefin comonomer and a density from greater than 0.94 g/cc, or 0.945 g/cc, or 0.95 g/cc, or 0.955 g/cc to 0.96 g/cc, or 0.97 g/cc, or 0.98 g/cc. The HDPE can be a monomodal copolymer or a multimodal copolymer. A "monomodal ethylene copolymer" is an ethylene/$C_4$-$C_{10}$α-olefin copolymer that has one distinct peak in a gel permeation chromatography (GPC) showing the molecular weight distribution. A "multimodal ethylene copolymer" is an ethylene/$C_4$-$C_{10}$α-olefin copolymer that has at least two distinct peaks in a GPC showing the molecular weight distribution. Multimodal includes copolymer having two peaks (bimodal) as well as copolymer having more than two peaks. Nonlimiting examples of HDPE include DOW™ High Density Polyethylene (HDPE) Resins (available from The Dow Chemical Company), ELITE™ Enhanced Polyethylene Resins (available from The Dow Chemical Company), CONTINUUM™ Bimodal Polyethylene Resins (available from The Dow Chemical Company), LUPOLEN™ (available from LyondellBasell), as well as HDPE products from Borealis, Ineos, and ExxonMobil.

A "hydrocarbon" is a compound that contains only hydrogen and carbon atoms. The hydrocarbon can be (i) branched or unbranched, (ii) saturated or unsaturated (iii) cyclic or acyclic, and (iv) any combination of (i)-(iii). Nonlimiting examples of hydrocarbons include alkanes, alkenes, and alkynes.

The term "independently," or "each is independently selected from," or like terms refers to the separate selection of an element for each individual member within a target group. For example, the term "for each of Compound 1 through Compound 5, independently, $R_1$ through $R_5$ each independently is selected from methyl, ethyl, and propyl" indicates that (i) the property of a given substituent $R_1$-$R_5$ with respect to each Compound 1-5 is separate and individual (i.e., $R_1$ (methyl) of Compound 1 can be the same or different element as $R_1$ (methyl, ethyl, or propyl) for Compounds 2, 3, 4, or 5) and (ii) the selection for substituents $R_1$ through $R_5$ is separate for each individual substituent (i.e., $R_1$ (ethyl) can be the same or different element with respect to $R_2$, $R_3$, $R_4$, and $R_5$ (methyl, ethyl, or propyl).

An "interpolymer" is a polymer prepared by the polymerization of at least two different monomers. This generic term includes copolymers, usually employed to refer to polymers prepared from two different monomers, and polymers prepared from more than two different monomers, e.g., terpolymers, tetrapolymers, etc.

"Low density polyethylene" (or "LDPE") consists of ethylene homopolymer, or ethylene/α-olefin copolymer comprising at least one $C_3$-$C_{10}$ α-olefin, preferably $C_3$-$C_4$ that has a density from 0.915 g/cc to 0.940 g/cc and contains long chain branching with broad MWD. LDPE is typically produced by way of high pressure free radical polymerization (tubular reactor or autoclave with free radical initiator). Nonlimiting examples of LDPE include MarFlex™ (Chevron Phillips), LUPOLEN™ (LyondellBasell), as well as LDPE products from Borealis, Ineos, ExxonMobil, and others.

"Linear low density polyethylene" (or "LLDPE") is a linear ethylene/α-olefin copolymer containing heterogeneous short-chain branching distribution comprising units derived from ethylene and units derived from at least one $C_3$-$C_{10}$ α-olefin comonomer or at least one $C_4$-$C_8$ α-olefin comonomer, or at least one $C_6$-$C_8$ α-olefin comonomer. LLDPE is characterized by little, if any, long chain branching, in contrast to conventional LDPE. LLDPE has a density from 0.910 g/cc, or 0.915 g/cc, or 0.920 g/cc, or 0.925 g/cc to 0.930 g/cc, or 0.935 g/cc, or 0.940 g/cc. Nonlimiting examples of LLDPE include TUFLIN™ linear low density polyethylene resins (available from The Dow Chemical Company), DOWLEX™ polyethylene resins (available from the Dow Chemical Company), and MARLEX™ polyethylene (available from Chevron Phillips).

"Multi-component ethylene-based copolymer" (or "EPE") comprises units derived from ethylene and units derived from at least one $C_3$-$C_{10}$ α-olefin comonomer, or at least one $C_4$-$C_8$ α-olefin comonomer, or at least one $C_6$-$C_8$ α-olefin comonomer, such as described in patent references U.S. Pat. Nos. 6,111,023; 5,677,383; and 6,984,695. EPE resins have a density from 0.905 g/cc, or 0.908 g/cc, or 0.912 g/cc, or 0.920 g/cc to 0.926 g/cc, or 0.929 g/cc, or 0.940 g/cc, or 0.962 g/cc. Nonlimiting examples of EPE resins include ELITE™ enhanced polyethylene (available from The Dow Chemical Company), ELITE AT™ advanced technology resins (available from The Dow Chemical Company), SUR-PASS™ Polyethylene (PE) Resins (available from Nova Chemicals), and SMART™ (available from SK Chemicals Co.).

An "olefin-based polymer" or "polyolefin" is a polymer that contains more than 50 weight percent polymerized olefin monomer (based on total amount of polymerizable monomers), and optionally, may contain at least one comonomer. A nonlimiting examples of an olefin-based polymer is ethylene-based polymer.

A "polymer" is a compound prepared by polymerizing monomers, whether of the same or a different type, that in polymerized form provide the multiple and/or repeating "units" or "mer units" that make up a polymer. The generic term polymer thus embraces the term homopolymer, usually employed to refer to polymers prepared from only one type of monomer, and the term copolymer, usually employed to refer to polymers prepared from at least two types of monomers. It also embraces all forms of copolymer, e.g., random, block, etc. The terms "ethylene/α-olefin polymer" and "propylene/α-olefin polymer" are indicative of copolymer as described above prepared from polymerizing ethylene or propylene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to has being based on "units" that are the polymerized form of a corresponding monomer.

"Single-site catalyzed linear low density polyethylenes" (or "m-LLDPE") are linear ethylene/α-olefin copolymers containing homogeneous short-chain branching distribution comprising units derived from ethylene and units derived from at least one $C_3$-$C_{10}$ α-olefin comonomer, or at least one $C_4$-$C_8$ α-olefin comonomer, or at least one $C_6$-$C_8$ α-olefin comonomer. m-LLDPE has density from 0.913 g/cc, or 0.918 g/cc, or 0.920 g/cc to 0.925 g/cc, or 0.940 g/cc. Nonlimiting examples of m-LLDPE include EXCEED™ metallocene PE (available from ExxonMobil Chemical), LUFLEXEN™ m-LLDPE (available from LyondellBasell), and ELTEX™ PF m-LLDPE (available from Ineos Olefins & Polymers).

"Ultra low density polyethylene" (or "ULDPE") and "very low density polyethylene" (or "VLDPE") each is a linear ethylene/α-olefin copolymer containing heterogeneous short-chain branching distribution comprising units derived from ethylene and units derived from at least one $C_3$-$C_{10}$ α-olefin comonomer, or at least one $C_4$-$C_8$ α-olefin comonomer, or at least one $C_6$-$C_8$ α-olefin comonomer. ULDPE and VLDPE each has a density from 0.885 g/cc, or 0.90 g/cc to 0.915 g/cc. Nonlimiting examples of ULDPE and VLDPE include ATTANE™ ultra low density polyethylene resins (available form The Dow Chemical Company) and FLEXOMER™ very low density polyethylene resins (available from The Dow Chemical Company).

Test Methods

Coefficient of Friction (COF) at 100 millimeters per minute (mm/min) is measured according to ISO 8295 (dynamic COF). The substrate employed is 304 Stainless Steel.

Coefficient of Friction (COF) at 12 meters per minute (m/min) is measured using the "at line" COF testing apparatus described in International Publication No. WO 2011/019787, the entire contents of which are herein incorporated by reference. During testing, a sample film roll or laminate roll is mounted on a slitter rewinder and threaded through the at line COF testing apparatus and back to the slitter rewinder drive roller. Sample motion is controlled using the slitter rewinder control system. The wrap angle across the 304 Stainless Steel static roller surface (β) is 0.52 radians. The sealant layer of the sample film or laminate is in contact with the static roller surface during testing. Dynamic COF is tested at a sample linear speed of 12 m/min. COF is determined using Amonton's law via measurement of the sample tension using the following Equation (A): $T_2=T_1 e^{\mu\beta}$, wherein $T_1$ is the tension of the sample before wrapping around the static roller, $T_2$ is the tension of the sample after wrapping around the static roller, μ is the COF, and β is the wrap angle wrap angle across the static roller surface.

Density is measured in accordance with ASTM D792, Method B. The result is recorded in grams per cubic centimeter (g/cc).

Melt index (MI) (I2) in g/10 min is measured using ASTM D-1238-04 (190° C./2.16 kg).

Differential Scanning Calorimetry (DSC)

Differential Scanning calorimetry (DSC) can be used to measure the melting, crystallization, and glass transition behavior of a polymer over a wide range of temperature. For example, the TA Instruments Q1000 DSC, equipped with an RCS (refrigerated cooling system) and an autosampler is used to perform this analysis. During testing, a nitrogen purge gas flow of 50 ml/min is used. Each sample is melt pressed into a thin film at 190° C.; the melted sample is then air-cooled to room temperature (25° C.). A 3-10 mg, 6 mm diameter specimen is extracted from the cooled polymer, weighed, placed in a light aluminum pan (50 mg), and crimped shut. Analysis is then performed to determine its thermal properties.

The thermal behavior of the sample is determined by ramping the sample temperature up and down to create a heat flow versus temperature profile. First, the sample is rapidly heated to 180° C. and held isothermal for 3 minutes in order to remove its thermal history. Next, the sample is cooled to −80° C. at a 10° C./minute cooling rate and held isothermal at −80° C. for 3 minutes. The sample is then heated to 180° C. (this is the "second heat" ramp) at a 10° C./minute heating rate. The cooling and second heating curves are recorded. The values determined are extrapolated onset of melting, Tm, and extrapolated onset of crystallization, Tc. Heat of fusion (Hf) (in Joules per gram), the calculated % crystallinity for polyethylene samples using the following equation: % Crystallinity=((Hf)/292 J/g)×100; and the calculated % crystallinity for polyethylene samples using the following equation: % Crystallinity=((Hf)/292 J/g)×100. The heat of fusion (Hf) and the peak melting temperature are reported from the second heat curve. Peak crystallization temperature is determined from the cooling curve.

Melting point, Tm, is determined from the DSC heating curve by first drawing the baseline between the start and end of the melting transition. A tangent line is then drawn to the data on the low temperature side of the melting peak. Where this line intersects the baseline is the extrapolated onset of melting (Tm). This is as described in Bernhard Wunderlich, The Basis of Thermal Analysis, in Thermal Characterization of Polymeric Materials 92, 277-278 (Edith A. Turi ed., 2d ed. 1997).

Gel Permeation Chromatography (GPC)

A high temperature gel permeation chromatography (GPC) system, equipped with Robotic Assistant Deliver (RAD) system is used for sample preparation and sample injection. The concentration detector is an Infra-red detector (IR-5) from Polymer Char Inc. (Valencia, Spain). Data collection is performed using a Polymer Char DM 100 Data acquisition box. The carrier solvent is 1,2,4-trichlorobenzene (TCB). The system is equipped with an on-line solvent degas device from Agilent. The column compartment is operated at 150° C. The columns are four Mixed A LS 30 cm, 20 micron columns. The solvent is nitrogen-purged 1,2,4-trichlorobenzene (TCB) containing approximately 200 ppm 2,6-di-t-butyl-4-methylphenol (BHT). The flow rate is 1.0 mL/min, and the injection volume is 200 μl. A "2 mg/mL" sample concentration is prepared by dissolving the sample in $N_2$ purged and preheated TCB (containing 200 ppm BHT), for 2.5 hours at 160° C., with gentle agitation.

The GPC column set is calibrated by running twenty narrow molecular weight distribution polystyrene standards. The molecular weight (MW) of the standards ranges from 580 g/mol to 8,400,000 g/mol, and the standards are contained in six "cocktail" mixtures. Each standard mixture has at least a decade of separation between individual molecular weights. The equivalent polypropylene molecular weights of each PS standard are calculated by using following equation, with reported Mark-Houwink coefficients for polypropylene (Th. G. Scholte, N. L. J. Meijerink, H. M. Schoffeleers, & A. M. G. Brands, J. Appl. Polym. Sci., 29, 3763-3782 (1984)) and polystyrene (E. P. Otocka, R. J. Roe, N. Y. Hellman, & P. M. Muglia, Macromolecules, 4, 507 (1971)):

$$M_{PP} = \left(\frac{K_{PS} M_{PS}^{a_{PS}+1}}{K_{PP}}\right)^{\frac{1}{a_{PP}+1}}, \quad \text{(Eq 1)}$$

where $M_{PP}$ is PP equivalent MW, $M_{PS}$ is PS equivalent MW, log K and a values of Mark-Houwink coefficients for PP and PS are listed below.

| Polymer | α | log K |
|---|---|---|
| Polypropylene | 0.725 | −3.721 |
| Polystyrene | 0.702 | −3.900 |

A logarithmic molecular weight calibration is generated using a fourth order polynomial fit as a function of elution volume. Number average and weight average molecular weights are calculated according to the following equations:

$$M_n = \frac{\sum^i W_{f_i}}{\sum^i (W_{f_i}/M_i)}, \quad \text{(Eq 2)}$$

$$M_w = \frac{\sum^i (W_{f_i} * M_i)}{\sum^i (W_{f_i})}, \quad \text{(Eq 3)}$$

where $Wf_i$ and $M_i$ are the weight fraction and molecular weight of elution component i, respectively.

GPC-Triple Detector (PDMS Mw and Mn Measurement)

Weight average molecular weight (Mw) and number average molecular weight (Mn) of the polydimethylsiloxane are measured by GPC (Viscotek™ GPC Max) using a triple detection capability. The Viscotek™ TDA305 unit is equipped with a differential refractometer, an online differential pressure viscometer, and low angle light scattering (LALS: 7° and 90° angles of detection). The mobile phase is Toluene HPLC grade. The columns are two PL Gel Mixed C from Varian—(7.5*300 mm, 5 μm particle size) and a PL Gel Guard column from Varian—(7.5*300 mm) 5 fractom Injection volume with a flow of 1 mL/min and a run time of 37 min. The column and detector temperature is 40° C. The software used is Omnisec 4.6.1 (Viscotek™).

The detectors are calibrated by injection of a narrow polystyrene standard (Mw 68,100 g/mol) of a known concentration. Correct run parameters are checked by using a narrow molecular weight distribution polystyrene standard (PS71K). The molecular weight averages must be within the Statistical Process Control (SPC) chart in order to validate the detectors calibration. Typical $GPC^3$ precision and accuracy (which depends on the refractive index increment) are around 2-3%.

DETAILED DESCRIPTION

The present disclosure provides a laminate. The laminate includes a first film and a second film, wherein the first film is laminated to a second film. The first film includes a sealant layer containing (A) an ethylene-based polymer; and (B) a slip agent blend containing (i) a first polydimethylsiloxane having a number average molecular weight (Mn) from 30,000 g/mol to less than 300,000 g/mol; and (ii) a second polydimethylsiloxane having a number average molecular weight (Mn) from 300,000 g/mol to 2,000,000 g/mol.

First Film

The laminate includes a first film. The first film includes a sealant layer.

The first film may be a monolayer film or a multilayer film. The first multilayer film contains two layers, or more than two layers. For example, the first multilayer film can have two, three, four, five, six, seven, eight, nine, ten, eleven, or more layers. In an embodiment, the first multilayer film contains only two layers, or only three layers. In an embodiment, the first film is a multilayer film with a sealant layer, a core layer, and a release layer, wherein the core layer is in contact with the sealant layer and the release layer is in contact with the core layer.

1. Sealant Layer

The first film includes a sealant layer. The sealant layer contains (A) an ethylene-based polymer; and (B) a slip agent blend containing (i) a first polydimethylsiloxane having a number average molecular weight (Mn) from 30,000 g/mol to less than 300,000 g/mol; and (ii) a second polydimethylsiloxane having a number average molecular weight (Mn) from 300,000 g/mol to 2,000,000 g/mol; and, optionally, (C) an additive.

The sealant layer has two opposing surfaces. In an embodiment, the sealant layer is a continuous layer with two opposing surfaces.

A. Ethylene-Based Polymer

The sealant layer contains an ethylene-based polymer. Nonlimiting examples of suitable ethylene-based polymer include LDPE and linear polyethylene. Nonlimiting examples of linear polyethylene include LLDPE, ULDPE, VLDPE, EPE, ethylene/α-olefin multi-block copolymers (also known as olefin block copolymer (OBC)), m-LLDPE, substantially linear, or linear, plastomers/elastomers, HDPE, and combinations thereof. Nonlimiting examples of suitable ethylene-based polymer also include ethylene/α-olefin interpolymer and ethylene/α-olefin copolymer. Nonlimiting examples of suitable α-olefins include $C_3$-$C_{20}$α-olefins, or $C_4$-$C_{20}$α-olefins, or $C_3$-$C_{10}$ α-olefins, or $C_4$-$C_{10}$ α-olefins, or $C_4$-$C_8$ α-olefins. Representative α-olefins include propylene, 1-butene, 1-pentene, 1-hexene, 1-heptene and 1-octene. In an embodiment, the ethylene-based polymer does not contain an aromatic comonomer polymerized therein. In an embodiment, the ethylene-based polymer is an ethylene/octene interpolymer.

In an embodiment, the ethylene-based polymer contains greater than 50 wt % units derived from ethylene, or from 51 wt %, or 55 wt %, or 60 wt % to 70 wt %, or 80 wt %, or 90 wt %, or 95 wt %, or 99 wt %, or 100 wt % units derived from ethylene, based on the weight of the ethylene-based polymer. In an embodiment, the ethylene-based polymer contains a reciprocal amount of units derived from an α-olefin comonomer, or from less than 50 wt %, or 49 wt %, or 45 wt %, or 40 wt % to 30 wt %, or 20 wt %, or 10 wt %, or 5 wt %, or 1 wt %, or 0 wt % units derived from an α-olefin comonomer, based on the weight of the ethylene-based polymer.

In an embodiment, the ethylene-based polymer is an ethylene plastomer/elastomer. The ethylene plastomer/elastomer is an ethylene/α-olefin copolymer consisting of units derived from ethylene and a $C_3$-$C_{10}$ α-olefin comonomer, or a $C_4$-$C_8$ α-olefin comonomer, or a $C_6$-$C_8$ α-olefin comonomer and optional additives. In an embodiment, the ethylene plastomer/elastomer is an ethylene/$C_4$-$C_8$ α-olefin copolymer having one, some, or all of the following properties:
 (a) a density from 0.870 g/cc, or 0.880 g/cc, or 0.890 g/cc to 0.900 g/cc, or 0.902 g/cc, or 0.904 g/cc, or 0.909 g/cc, or 0.910 g/cc, or 0.917 g/cc; and/or
 (b) a melt index from a melt index from 0.1 g/10 min, or 1 g/10 min to 1.5 g/10 min, or 2.0 g/10 min, or 3.0 g/10 min, or 5.0 g/10 min, or 6.0 g/10 min, or 8.0 g/10 min, or 10 g/10 min, or 15 g/10 min, or 20 g/10 min, or 30 g/10 min, or 40 g/10 min, or 50 g/10 min, or 100 g/10 min, or 150 g/10 min, or 200 g/10 min, or 250 g/10 min, or 300 g/10 min; and/or
 (c) a melting point (Tm) from 40° C., or 45° C., or 50° C., or 55° C., or 60° C., or 65° C., or 70° C., or 75° C. to 80° C., or 85° C., or 90° C., or 95° C., or 100° C., or 105° C., or 110° C., or 115° C., or 120° C.

In an embodiment, the ethylene plastomer/elastomer is an ethylene/1-octene copolymer with a density of 0.902 g/cc, a melt index of 1.0 g/10 min, and a melting point of 99° C. (e.g., AFFINITY™ PL 1880G, available from The Dow Chemical Company)

In an embodiment, the ethylene-based polymer is a low density polyethylene (LDPE). The LDPE is an ethylene homopolymer or an ethylene/α-olefin copolymer consisting of units derived from ethylene and a $C_3$-$C_{10}$ α-olefin comonomer, or a $C_4$-$C_8$ α-olefin comonomer, or a $C_6$-$C_8$ α-olefin comonomer. The LDPE has one or both of the following properties: (a) a density from 0.915 g/cc, or 0.920 g/cc, or 0.925 g/cc to 0.930 g/cc, or 0.935 g/cc, or 0.940 g/cc; and/or (b) a melt index from a melt index from 0.1 g/10 min, or 1 g/10 min, or 1.5 g/10 min, or 2.0 g/10 min to 3.0 g/10 min, or 5.0 g/10 min, or 6.0 g/10 min, or 8.0 g/10 min, or 10 g/10 min, or 15 g/10 min, or 20 g/10 min, or 30 g/10 min, or 40 g/10 min, or 50 g/10 min, or 100 g/10 min.

The sealant layer may contain more than one ethylene-based polymer. In an embodiment, the sealant layer includes at least two ethylene-based polymers, wherein each ethylene-based polymer differs from one another compositionally, structurally, and/or physically. In an embodiment, the sealant layer contains an ethylene plastomer/elastomer and a LDPE. In another embodiment, the sealant layer contains an ethylene plastomer/elastomer and a LLDPE.

In an embodiment, the sealant layer contains from 70 wt %, or 75 wt %, or 80 wt %, or 85 wt %, or 90 wt % to 93 wt %, or 94 wt %, or 95 wt %, or 96 wt %, or 97 wt %, or 98 wt %, or 99 wt %, or 99.9 wt % ethylene-based polymer, based on the total weight of the sealant layer.

The ethylene-based polymer may comprise two or more embodiments discussed herein.

B. Slip Agent Blend

The sealant layer contains a slip agent blend. The slip agent blend contains (i) a first polydimethylsiloxane having a number average molecular weight (Mn) from 30,000 g/mol to less than 300,000 g/mol; and (ii) a second polydimethylsiloxane having a number average molecular weight (Mn) from 300,000 g/mol to 2,000,000 g/mol, based on the total weight of the slip agent blend.

"Polydimethylsiloxane" ("PDMS") is a polymeric organosilicon compound with the following general Structure (I):

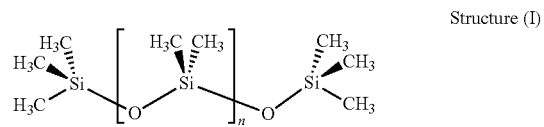

Structure (I)

wherein n is the number of repeating monomer [$SiO(CH_3)_2$] units and n is greater than or equal to 2, or from 2 to 20,000. The PDMS may be unsubstituted or substituted. A "substituted PDMS" is a PDMS in which at least one methyl group of Structure (I) is substituted with a substituent. Nonlimiting examples of substituents include halogen atoms (such as chlorine, fluorine, bromine, and iodine); halogen atom-containing groups (such as chloromethyl groups, perfluorobutyl groups, trifluoroethyl groups, and nonafluorohexyl groups); oxygen atom-containing groups (such as hydroxy groups, alkoxy groups (such as methoxy groups and ethoxy groups), (meth)acrylic epoxy groups, and carboxyl groups); nitrogen atom-containing groups (such as amino-functional groups, amido-functional groups, and cyano-functional groups); sulphur atom-containing groups (such as mercapto groups); hydrogen; $C_2$-$C_{10}$ alkyl groups (such as an ethyl group); $C_2$-$C_{10}$ alkynyl groups; alkenyl groups (such as vinyl groups and hexenyl groups); aryl groups (such as phenyl groups and substituted phenyl groups); cycloalkyl groups (such as cyclohexane groups); and combinations thereof. The substituted methyl group may be a terminal methyl group or a non-terminal methyl group. Nonlimiting examples of suitable substituted PDMS include trialkylsilyl terminated PDMS wherein at least one alkyl is a $C_2$-$C_{10}$ alkyl; dialkylhydroxysilyl terminated PDMS; dialkylhydrogensilyl terminated PDMS; dialkylalkenyl silyl terminated PDMS; and dialkylvinylsilyl terminated PDMS. In an embodiment, the substituted PDMS is a dimethylhydroxysilyl terminated PDMS. In another embodiment, the substituted PDMS is a dimethylvinylsilyl terminated PDMS.

In an embodiment, the substituted PDMS excludes nitrogen atom-containing groups. In another embodiment, the substituted PDMS excludes epoxy substituent groups.

In an embodiment, the PDMS is unsubstituted. An "unsubstituted PDMS" is the PDMS of Structure (I) wherein no methyl group in Structure (I) is substituted with a substituent. In an embodiment, the unsubstituted PDMS is a trimethylsilyl terminated PDMS.

(i) First Polydimethylsiloxane

The slip agent blend contains a first polydimethylsiloxane having a number average molecular weight (Mn) from 30,000 g/mol to less than 300,000 g/mol (a "low Mn" PDMS).

In an embodiment, the first PDMS (i.e., the low Mn PDMS) has a number average molecular weight (Mn) from 30,000 g/mol, or 40,000 g/mol, or 45,000 g/mol, or 48,000 g/mol to 49,000 g/mol, or 50,000 g/mol, or 55,000 g/mol, or 60,000 g/mol, or 65,000 g/mol, or 70,000 g/mol, or 75,000 g/mol, or 80,000 g/mol, or 90,000 g/mol, or 100,000 g/mol, or 150,000 g/mol, or 200,000 g/mol, or 250,000 g/mol, or 290,000 g/mol, or less than 300,000 g/mol. In an embodiment, the low Mn PDMS has a number average molecular weight (Mn) from 30,000 g/mol, or 35,000 g/mol, or 40,000 g/mol, or 45,000 g/mol, or 48,000 g/mol to 49,000 g/mol, or less than 50,000 g/mol.

In an embodiment, the low Mn PDMS has a weight average molecular weight (Mw) from 30,000 g/mol, or 40,000 g/mol, or 45,000 g/mol, or 50,000 g/mol, or 55,000 g/mol, or 60,000 g/mol, or 65,000 g/mol, or 70,000 g/mol, or 75,000 g/mol, or 80,000 g/mol, or 90,000 g/mol, or 100,000 g/mol, or 120,000 g/mol to 130,000 g/mol, or 140,000 g/mol, or 150,000 g/mol, or 200,000 g/mol, or 250,000 g/mol, or 290,000 g/mol, or less than 300,000 g/mol.

In an embodiment, the low Mn PDMS has a molecular weight distribution (Mw/Mn) from 1.0, or 1.5, or 2.0, or 2.1, or 2.2, or 2.3, or 2.4 to 2.5, or 2.6, or 2.7, or 2.8, or 2.9, or 3.0, or 3.5.

In an embodiment, the low Mn PDMS has the Structure (I) and n is from 2, or 5, or 10, or 50, or 100, or 150, or 200, or 250, or 300, or 350, or 400, or 450, or 500, or 550, or 600, or 650 to 700, or 750, or 800, or 850, or 900, or 950, or 1000, or 1100, or 1200, or 1300, or 1400, or 1500, or 1600, or 1700, or 1800, or 1900, or 2000, or 2500, or 3000, or 3500, or 4000, or 4054.

In an embodiment, the low Mn PDMS is a dimethylhydroxysilyl terminated PDMS.

In an embodiment, the low Mn PDMS (such as a dimethylhydroxysilyl terminated PDMS) has a number average molecular weight (Mn) from 30,000 g/mol, or 35,000 g/mol, or 40,000 g/mol, or 45,000 g/mol, or 48,000 g/mol to 49,000 g/mol, or 50,000 g/mol; and the low Mn PDMS has one, some, or all of the following properties:
  (a) a weight average molecular weight (Mw) from 50,000 g/mol, or 55,000 g/mol, or 60,000 g/mol, or 65,000 g/mol, or 70,000 g/mol, or 75,000 g/mol, or 80,000 g/mol, or 90,000 g/mol, or 100,000 g/mol, or 120,000 g/mol to 130,000 g/mol, or 150,000 g/mol; and/or
  (b) a molecular weight distribution (Mw/Mn) from 2.2, or 2.3, or 2.4 to 2.5, or 2.6; and/or
  (c) the low Mn PDMS has the Structure (I) and n is from 2, or 5, or 10, or 50, or 100, or 150, or 200, or 250, or 300, or 350, or 400, or 450, or 500, or 550, or 600, or 650 to 700, or 750, or 800, or 850, or 900, or 950, or 1000, or 1100, or 1200, or 1300, or 1400, or 1500, or 1600, or 1700, or 1800, or 1900, or 2000, or 2500, or 3000, or 3500, or 4000, or 4054.

The slip agent blend may contain more than one low Mn PDMS.

The first PDMS (i.e., the low Mn PDMS) may comprise two or more embodiments discussed herein.

(ii) Second Polydimethylsiloxane

The slip agent blend contains a second polydimethylsiloxane having a number average molecular weight (Mn) from 300,000 g/mol to 2,000,000 g/mol (a "high Mn" PDMS).

In an embodiment, the second PDMS (i.e., the high Mn PDMS) has a number average molecular weight (Mn) from 300,000 g/mol, or 310,000 g/mol, or 320,000 g/mol, or 330,000 g/mol, or 340,000 g/mol, or 350,000 g/mol to 360,000 g/mol, or 370,000 g/mol, or 380,000 g/mol, or 390,000 g/mol, or 400,000 g/mol, or 450,000 g/mol, or 500,000 g/mol, or 550,000 g/mol, or 600,000 g/mol, or 750,000 g/mol, or 1,000,000 g/mol, or 1,500,000 g/mol, or 2,000,000 g/mol. In an embodiment, the high Mn PDMS has a number average molecular weight (Mn) from 300,000 g/mol, or 310,000 g/mol, or 320,000 g/mol, or 330,000 g/mol, or 340,000 g/mol, or 350,000 g/mol to 360,000 g/mol, or 370,000 g/mol, or 380,000 g/mol, or 390,000 g/mol, or 400,000 g/mol, or 450,000 g/mol, or 500,000 g/mol, or 550,000 g/mol.

In an embodiment, the high Mn PDMS has a weight average molecular weight (Mw) from 350,000 g/mol, or 360,000 g/mol, or 370,000 g/mol, or 380,000 g/mol, or 390,000 g/mol, or 400,000 g/mol, or 450,000 g/mol, or 500,000 g/mol, or 600,000 g/mol, or 640,000 g/mol to 650,000 g/mol, or 700,000 g/mol, or 750,000 g/mol, or 800,000 g/mol, or 900,000 g/mol, or 1,000,000 g/mol, or 1,500,000 g/mol, or 2,000,000 g/mol.

In an embodiment, the high Mn PDMS has a molecular weight distribution (Mw/Mn) from 1.0, or 1.5, or 1.8 to 1.9, or 2.0, or 2.1, or 2.2, or 2.3, or 2.4, or 2.5, or 2.6, or 2.7, or 2.8, or 2.9, or 3.0.

In an embodiment, the high Mn PDMS has the Structure (I) and n is greater than 4054, or from 4054, or 4500 to 5000, or 5500, or 6000, or 6500, or 7000, or 7500, or 8000, or 8500, or 9000, or 9500, or 10000, or 11000, or 12000, or 13000, or 14000, or 15000, or 16000, or 17000, or 18000, or 19000, or 20000, or 21000, or 22000, or 23000, or 24000, or 25000, or 26000, or 27000, or 27027.

In an embodiment, the high Mn PDMS is a dimethylvinylsilyl terminated PDMS.

In an embodiment, the high Mn PDMS (such as a dimethylvinylsilyl terminated PDMS) has a number average molecular weight (Mn) from 300,000 g/mol, or 310,000 g/mol, or 320,000 g/mol, or 330,000 g/mol, or 340,000 g/mol, or 350,000 g/mol to 360,000 g/mol, or 370,000 g/mol, or 380,000 g/mol, or 390,000 g/mol, or 400,000 g/mol, or 450,000 g/mol, or 500,000 g/mol, or 550,000 g/mol; and the high Mn PDMS has one, some, or all of the following properties:
  (a) a weight average molecular weight (Mw) from 400,000 g/mol, or 450,000 g/mol, or 500,000 g/mol, or 600,000 g/mol, or 640,000 g/mol to 650,000 g/mol, or 700,000 g/mol, or 750,000 g/mol, or 800,000 g/mol, or 900,000 g/mol, or 1,000,000 g/mol; and/or
  (b) a molecular weight distribution (Mw/Mn) from 1.5, or 1.8 to 1.9, or 2.0, or 2.1; and/or
  (c) the high Mn PDMS has the Structure (I) and n is greater than 4054, or from 4054, or 4500 to 5000, or 5500, or 6000, or 6500, or 7000, or 7500, or 8000, or 8500, or 9000, or 9500, or 10000, or 11000, or 12000, or 13000, or 14000, or 15000, or 16000, or 17000, or 18000, or 19000, or 20000, or 21000, or 22000, or 23000, or 24000, or 25000, or 26000, or 27000, or 27027.

The slip agent blend may contain more than one high Mn PDMS.

The second PDMS (i.e., the high Mn PDMS) may comprise two or more embodiments discussed herein.

In an embodiment, the sealant layer contains from 0.1 wt %, or 0.2 wt %, or 0.3 wt %, or 0.4 wt %, or 0.5 wt %, or 1.0 wt %, or 1.5 wt %, or 1.8 wt % to 2.0 wt %, or 2.3 wt %, or 2.5 wt %, or 2.8 wt %, or 3.0 wt %, or 3.5 wt %, or 4.0 wt %, or 4.5 wt %, or 5.0 wt % of the slip agent blend, based on the total weight of the sealant layer. In another embodiment, the sealant layer contains from 0.5 wt %, or 1.0 wt % to 1.5 wt %, or 2.0 wt %, or 2.5 wt % of the slip agent blend, based on the total weight of the sealant layer. In another embodiment, the sealant layer contains from 0.5 wt %, or 0.8 wt % to 1.0 wt %, or 1.5 wt %, or 2.0 wt %, or 2.5 wt % of the slip agent blend, based on the total weight of the sealant layer. The first PDMS (i.e., the low Mn PDMS) and the second PDMS (i.e., the high Mn PDMS) may be included in the sealant layer as part of a masterbatch in which one or both of the PDMS components is dispersed in a polymer matrix (such as a LDPE matrix). However, the amount of slip agent blend included in the sealant layer refers only to the amount of the first PDMS (i.e., the low Mn PDMS) and the second PDMS (i.e., the high Mn PDMS) included in the sealant layer, and excludes the weight of the polymer matrix of any PDMS masterbatch. In other words, the amount of slip agent blend refers to the combined amount of the first PDMS and the second PDMS included in the sealant layer.

In an embodiment, the slip agent blend contains from 1 wt % to 99 wt % of the first PDMS (i.e., the low Mn PDMS) and a reciprocal amount, or from 1 wt % to 99 wt % of the second PDMS (i.e., the high Mn PDMS), based on the total weight of the slip agent blend (i.e., based on the combined amount of the first PDMS and the second PDMS). In another embodiment, the slip agent blend contains from 1 wt % to less than 50 wt % of the first PDMS and from greater than 50 wt % to 99 wt % of the second PDMS, based on the total weight of the slip agent blend. In an embodiment, the slip agent blend contains from 1 wt %, or 2 wt %, or 5 wt %, or 10 wt %, or 15 wt %, or 20 wt % to 25 wt %, or 30 wt %, or 35 wt %, or 40 wt %, or 45 wt %, or 49 wt %, or less than 50 wt % of the first PDMS, and a reciprocal amount of the second PDMS, or from greater than 50 wt %, or 51 wt %, or 55 wt %, or 60 wt %, or 65 wt %, or 70 wt %, or 75 wt % to 80 wt %, or 85 wt %, or 90 wt %, or 95 wt %, or 98 wt %, or 99 wt % of the second PDMS, based on the total weight of the slip agent blend. The combined amount of the first PDMS and the second PDMS yields a slip agent blend of 100 wt %.

In an embodiment, the sealant layer contains from 0.01 wt %, or 0.05 wt %, or 0.10 wt %, or 0.20 wt %, or 0.30 wt %, or 0.40 wt %, or 0.50 wt % to 0.60 wt %, or 0.70 wt %, or 0.80 wt %, or 0.90 wt %, or 1.00 wt %, or 1.50 wt %, or 2.00 wt %, or 2.30 wt %, or 2.40 wt %, or less than 2.50 wt % of the first PDMS (i.e., the low Mn PDMS), based on the total weight of the sealant layer.

In an embodiment, the sealant layer contains from greater than 0.05 wt %, or 0.08 wt %, or 0.10 wt %, or 0.20 wt %, or 0.30 wt %, or 0.40 wt %, or 0.50 wt %, or 0.80 wt %, or 1.00 wt %, or 1.10 wt %, or 1.20 wt %, or 1.30 wt %, or 1.40 wt %, or 1.50 wt % to 1.60 wt %, or 1.70 wt %, or 1.80 wt %, or 1.90 wt %, or 2.00 wt %, or 2.50 wt %, or 3.00 wt %, or 3.50 wt %, or 4.00 wt %, or 4.50 wt %, or 4.95 wt % of the second PDMS (i.e., the high Mn PDMS), based on the total weight of the sealant layer.

In an embodiment, the weight ratio of the second PDMS (i.e., the high Mn PDMS) to the first PDMS (i.e., the low Mn PDMS) is from 1.1:1, or 1.5:1, or 2.0:1, or 3.0:1 to 4.0:1, or 5.0:1, or 10:1, or 15:1, or 20:1, or 25:1, or 30:1, or 40:1, or 50:1, or 60:1, or 70:1, or 80:1, or 90:1, or 99:1. In an embodiment, the weight ratio of second PDMS to the first PDMS is 3:1.

The slip agent blend may comprise two or more embodiments discussed herein.

C. Optional Additive(s)

In an embodiment, the sealant layer includes one or more optional additives. Nonlimiting examples of suitable additive include antiblock agents, antioxidants, antistatic agents, stabilizing agents, nucleating agents, colorants, pigments, ultra violet (UV) absorbers or stabilizers, flame retardants, compatibilizers, plasticizers, fillers, processing aids, antifog additive, crosslinking agents (e.g., peroxides), and combinations thereof.

In an embodiment, the sealant layer includes an antiblock agent. An "antiblock agent" is a compound that minimizes, or prevents, blocking (i.e., adhesion) between two adjacent layers of film by creating a microscopic roughening of the film layer surface, which reduces the available contact area between adjacent layers. The antiblock agent may be organic or inorganic. Nonlimiting examples of suitable antiblock agents include silica, talc, calcium carbonate, and combinations thereof. In an embodiment, the antiblock agent is silica ($SiO_2$). The silica may be organic silica or synthetic silica. In another embodiment, the antiblock agent is talc.

In an embodiment, the sealant layer contains from 0 wt %, or 0.01 wt %, or 0.05 wt %, or 0.1 wt %, or 0.2 wt % to 0.3 wt %, or 0.4 wt %, or 0.5 wt %, or 1.0 wt %, or 2.0 wt %, or 3.0 wt %, or 4.0 wt %, or 5.0 wt % additive, based on the total weight of the sealant layer.

In an embodiment, the sealant layer contains, consists essentially of, or consists of:

(A) from 70 wt %, or 75 wt %, or 80 wt %, or 85 wt %, or 90 wt % to 93 wt %, or 94 wt %, or 95 wt %, or 96 wt %, or 97 wt %, or 98 wt %, or 99 wt %, or 99.9 wt % ethylene-based polymer (such as an ethylene plastomer/elastomer, a LDPE, a LLDPE, or combinations thereof), based on the total weight of the sealant layer;

(B) from 0.1 wt %, or 0.2 wt %, or 0.3 wt %, or 0.4 wt %, or 0.5 wt %, or 1.0 wt %, or 1.5 wt %, or 1.8 wt % to 2.0 wt %, or 2.3 wt %, or 2.5 wt %, or 2.8 wt %, or 3.0 wt %, or 3.5 wt %, or 4.0 wt %, or 4.5 wt %, or 5.0 wt % slip agent blend, based on the total weight of the sealant layer; and (C) optionally, from 0 wt %, or 0.01 wt %, or 0.05 wt %, or 0.1 wt %, or 0.2 wt % to 0.3 wt %, or 0.4 wt %, or 0.5 wt %, or 1.0 wt %, or 2.0 wt %, or 3.0 wt %, or 4.0 wt %, or 5.0 wt % additive, based on the total weight of the sealant layer; and the slip agent blend contains:

(i) from 1 wt %, 5 wt %, or 10 wt %, or 15 wt %, or 20 wt % to 25 wt %, or 30 wt %, or 35 wt %, or 40 wt %, or 45 wt %, or 49 wt %, or less than 50 wt % of a first PDMS (such as a dimethylhydroxysilyl terminated PDMS) having a Mn from 30,000 g/mol, or 40,000 g/mol, or 45,000 g/mol, or 48,000 g/mol to 49,000 g/mol, or 50,000 g/mol, or 55,000 g/mol, or 60,000 g/mol, or 65,000 g/mol, or 70,000 g/mol, or 75,000 g/mol, or 80,000 g/mol, or 90,000 g/mol, or 100,000 g/mol, or 150,000 g/mol, or 200,000 g/mol, or 250,000 g/mol, based on the total weight of the slip agent blend; and (ii) from greater than 50 wt %, or 51 wt %, 55 wt %, or 60 wt %, or 65 wt %, or 70 wt %, or 75 wt % to 80 wt %, or 85 wt %, or 90 wt %, or 95 wt %, or 99 wt % of a second PDMS (such as a dimethylvinylsilyl terminated PDMS) having a Mn from 300,000 g/mol, or 310,000 g/mol, or 320,000 g/mol, or 330,000 g/mol, or 340,000 g/mol, or 350,000 g/mol to 360,000 g/mol, or 370,000 g/mol, or 380,000 g/mol, or 390,000 g/mol, or 400,000 g/mol, or 450,000 g/mol, or 500,000 g/mol, or 550,000 g/mol, or 600,000 g/mol, or 750,000 g/mol, or 1,000,000 g/mol, based on the total weight of the slip agent blend.

In an embodiment, the sealant layer contains, consists essentially of, or consists of:

(1) from 70 wt %, or 75 wt %, or 80 wt %, or 85 wt %, or 90 wt % to 93 wt %, or 94 wt %, or 95 wt %, or 96 wt %, or 97 wt %, or 98 wt %, or 99 wt %, or 99.9 wt % ethylene-based polymer (such as an ethylene plastomer/elastomer, a LDPE, a LLDPE, or combinations thereof), based on the total weight of the sealant layer;

(2) from 0.01 wt %, or 0.05 wt %, or 0.10 wt %, or 0.20 wt %, or 0.30 wt %, or 0.40 wt %, or 0.50 wt % to 0.60 wt %, or 0.70 wt %, or 0.80 wt %, or 0.90 wt %, or 1.00 wt %, or 1.50 wt %, or 2.00 wt %, or 2.30 wt %, or 2.40 wt %, or less than 2.50 wt % of a first PDMS (such as a dimethylhydroxysilyl terminated PDMS) having a Mn from 30,000 g/mol, or 40,000 g/mol, or 45,000 g/mol, or 48,000 g/mol to 49,000 g/mol, or 50,000 g/mol, or 55,000 g/mol, or 60,000 g/mol, or 65,000 g/mol, or 70,000 g/mol, or 75,000 g/mol, or 80,000 g/mol, or 90,000 g/mol, or 100,000 g/mol, or 150,000 g/mol, or 200,000 g/mol, or 250,000 g/mol, based on the total weight of the sealant layer;

(3) from greater than 0.05 wt %, or 0.08 wt %, or 0.10 wt %, or 0.20 wt %, or 0.30 wt %, or 0.40 wt %, or 0.50 wt %, or 0.80 wt %, or 1.00 wt %, or 1.10 wt %, or 1.20 wt %, or 1.30 wt %, or 1.40 wt %, or 1.50 wt % to 1.60 wt %, or 1.70 wt %, or 1.80 wt %, or 1.90 wt %, or 2.00 wt %, or 2.50 wt %, or 3.00 wt %, or 3.50 wt %, or 4.00 wt %, or 4.50 wt %, or 4.95 wt % of a second PDMS (such as a dimethylvinylsilyl terminated PDMS) having a Mn from 300,000 g/mol, or 310,000 g/mol, or 320,000 g/mol, or 330,000 g/mol, or 340,000 g/mol, or 350,000 g/mol to 360,000 g/mol, or 370,000 g/mol, or 380,000 g/mol, or 390,000 g/mol, or 400,000 g/mol, or 450,000 g/mol, or 500,000 g/mol, or 550,000 g/mol, or 600,000 g/mol, or 750,000 g/mol, or 1,000,000 g/mol, based on the total weight of the sealant layer; and (4) optionally, from 0 wt %, or 0.01 wt %, or 0.05 wt %, or 0.1 wt %, or 0.2 wt % to 0.3 wt %, or 0.4 wt %, or 0.5 wt %, or 1.0 wt %, or 2.0 wt %, or 3.0 wt %, or 4.0 wt %, or 5.0 wt % additive, based on the total weight of the sealant layer; and the weight ratio of the first PDMS to the second PDMS is from 1.5:1, or 2.0:1, or 3.0:1 to 4.0:1, or 5.0:1, or 10:1, or 15:1, or 20:1, or 25:1, or 30:1, or 40:1, or 50:1, or 60:1, or 70:1, or 80:1, or 90:1, or 99:1.

In an embodiment, the sealant layer excludes a migratory slip agent, such as an unsaturated fatty acid amide (e.g., erucamide and oleamide).

In an embodiment, the sealant layer has a COF at 100 mm/min from 0.01, or 0.05, or 0.10, or 0.20, or 0.25 to 0.27, or 0.28, or 0.29, or 0.30, or 0.35, or 0.39, or 0.40.

In an embodiment, the sealant layer has a COF at 12 m/min from 0.01, or 0.05, or 0.10, or 0.20, or 0.25 to 0.27, or 0.28, or 0.29, or 0.30, or 0.35, or 0.39, or 0.40.

In an embodiment, the sealant layer has a thickness from 5 μm, or 7 μm, or 10 μm to 15 μm, or 20 μm, or 25 μm, or 30 μm, or 35 μm, or 40 μm, or 45 μm, or 50 μm.

In an embodiment, the sealant layer is from 10 vol %, or 15 vol %, or 20 vol % to 25 vol %, or 30 vol %, or 40 vol %, or 50 vol %, or 60 vol %, or 70 vol %, or 80 vol %, or 90 vol %, or 95 vol % of the first film, based on the total volume of the first film.

In an embodiment, the sealant layer is a skin layer. A "skin layer" is an outermost layer of a film structure. In other words, at least one surface of a skin layer is an outermost surface of the film.

The sealant layer may comprise two or more embodiments discussed herein.

2. Optional Core Layer

In an embodiment, the first film includes a core layer. The core layer contains a second ethylene-based polymer. A "core layer" is a layer of a film structure that is an inner layer. In other words, neither surface of a core layer is an outer surface of the first film.

The core layer has two opposing surfaces. In an embodiment, the core layer is a continuous layer with two opposing surfaces.

The core layer is in contact with the sealant layer. The core layer may be in direct contact or in indirect contact with the sealant layer. In an embodiment, the core layer directly contacts the sealant layer. The term "directly contacts," as used herein, is a layer configuration whereby the sealant layer is located immediately adjacent to the core layer and no intervening layers, or no intervening structures, are present between the sealant layer and the core layer. In another embodiment, the core layer indirectly contacts the sealant layer. The term "indirectly contacts," as used herein, is a layer configuration whereby an intervening layer, or an intervening structure, is present between the sealant layer and the core layer.

The second ethylene-based polymer may be any ethylene-based polymer disclosed herein. The second ethylene-based polymer may be the same or different than the ethylene-based polymer of the sealant layer. In an embodiment, the second ethylene-based polymer is the same as the ethylene-based polymer of the sealant layer. In another embodiment, the second ethylene-based polymer is different than the ethylene-based polymer of the sealant layer.

In an embodiment, the second ethylene-based polymer is a LLDPE, a LDPE, or a combination thereof. In a further embodiment, the LLDPE is an ethylene/1-octene copolymer.

In an embodiment, the second layer contains from 1 wt %, or 5 wt %, or 10 wt %, or 20 wt %, or 30 wt %, or 40 wt %, or 50 wt % to 60 wt %, or 70 wt %, or 80 wt %, or 90 wt %, or 95 wt %, or 99 wt % LLDPE; and a reciprocal amount of LDPE, or from 1 wt %, or 5 wt %, or 10 wt %, or 20 wt %, or 30 wt %, or 40 wt %, or 50 wt % to 60 wt %, or 70 wt %, or 80 wt %, or 90 wt %, or 95 wt %, or 99 wt % LDPE, based on the total weight of the core layer.

In an embodiment, the core layer contains an optional additive. The additive may be any additive disclosed herein. In an embodiment, the core layer contains from 0 wt %, or 0.01 wt %, or 0.05 wt %, or 0.1 wt %, or 0.2 wt % to 0.3 wt %, or 0.4 wt %, or 0.5 wt %, or 1.0 wt %, or 2.0 wt %, or 3.0 wt %, or 4.0 wt %, or 5.0 wt % additive (e.g., a slip agent, an antiblock agent, or combinations thereof), based on the total weight of the core layer.

In an embodiment, the core layer has a thickness from 5 μm, or 8 μm, or 10 μm, or 15 μm, or 20 μm, or 25 μm, or 30 μm to 35 μm, or 40 μm, or 45 μm, or 50 μm, or 55 μm, or 60 μm, or 65 μm, or 70 μm, or 75 μm, or 80 μm.

In an embodiment, the core layer is from 10 vol %, or 15 vol %, or 20 vol %, or 25 vol %, or 30 vol %, or 40 vol %, or 50 vol %, or 60 vol % to 65 vol %, or 70 vol %, or 80 vol %, or 90 vol % of the first film, based on the total volume of the first film.

The core layer may comprise two or more embodiments discussed herein.

3. Optional Release Layer

In an embodiment, the first film includes a release layer. The release layer contains a third ethylene-based polymer.

The release layer has two opposing surfaces. In an embodiment, the release layer is a continuous layer with two opposing surfaces. The release layer is in contact with the core layer. The release layer may be in direct contact or in indirect contact with the core layer. In an embodiment, the release layer directly contacts the core layer. In another embodiment, the release layer indirectly contacts the core layer.

The third ethylene-based polymer may be any ethylene-based polymer disclosed herein. The third ethylene-based polymer may be the same or different than the ethylene-based polymer of the sealant layer, and the third ethylene-based polymer may be the same or different than the second ethylene-based polymer of the core layer. In an embodiment, the third ethylene-based polymer is the same as the second ethylene-based polymer of the core layer. In another embodiment, the third ethylene-based polymer is different than the second ethylene-based polymer of the core layer.

In an embodiment, the third ethylene-based polymer is a LLDPE, a LDPE, or a combination thereof. In a further embodiment, the LLDPE is an ethylene/1-octene copolymer. In an embodiment, the release layer contains from 5 wt %, or 10 wt %, or 20 wt %, or 30 wt %, or 40 wt %, or 50 wt % to 60 wt %, or 70 wt %, or 80 wt %, or 90 wt %, or 95 wt %, or 99 wt % LLDPE; and a reciprocal amount of LDPE, or from 1 wt %, or 5 wt %, or 10 wt %, or 20 wt %, or 30 wt %, or 40 wt %, or 50 wt % to 60 wt %, or 70 wt %, or 80 wt %, or 90 wt %, or 95 wt % LDPE, based on the total weight of the release layer.

In an embodiment, the release layer contains an optional additive. The additive may be any additive disclosed herein. In an embodiment, the release layer contains from 0 wt %, or 0.01 wt %, or 0.05 wt %, or 0.1 wt %, or 0.2 wt % to 0.3 wt %, or 0.4 wt %, or 0.5 wt %, or 1.0 wt %, or 2.0 wt %, or 3.0 wt %, or 4.0 wt %, or 5.0 wt % additive, based on the total weight of the release layer.

In an embodiment, the release layer has a thickness from 5 µm, or 7 µm, or 10 µm to 15 µm, or 20 µm, or 25 µm, or 30 µm, or 35 µm, or 40 µm, or 45 µm, or 50 µm.

In an embodiment, the release layer is from 10 vol %, or 15 vol %, or 20 vol % to 25 vol %, or 30 vol %, or 40 vol %, or 50 vol %, or 60 vol %, or 70 vol %, or 80 vol %, or 90 vol %, or 95 vol % of the film, based on the total volume of the first film.

In an embodiment, the release layer is a skin layer.

In an embodiment, the release layer is corona-treated.

The release layer may comprise two or more embodiments discussed herein.

In an embodiment, the first film is a multilayer film having the following Structure (II):

sealant layer/core layer/release layer    Structure (II).

In an embodiment, the first film is a multilayer film consisting essentially of, or consisting of, the sealant layer, the core layer, and the release layer.

In an embodiment, the first film has a thickness of from 15 µm, or 20 µm, or 25 µm, or 30 µm, or 35 µm, or 40 µm, or 45 µm, or 50 µm to 55 µm, or 60 µm, or 65 µm, or 70 µm, or 75 µm, or 80 µm, or 85 µm, or 90 µm, or 95 µm, or 100 µm.

In an embodiment, the first film excludes a migratory slip agent, such as an unsaturated fatty acid amide (e.g., erucamide and oleamide).

In an embodiment, the first film is a coextruded multilayer structure. Some methods, for example, used to construct films are by cast coextrusion or blown coextrusion methods. Combinations of these methods are also possible.

In an embodiment, the first film is not an oriented film. In a further embodiment, the first film is not biaxially oriented. In other words, the first film is not stretched after extrusion in some embodiments.

Second Film

The laminate includes a second film. The first film is laminated to the second film.

The second film may be a monolayer film or a multilayer film. The second multilayer film contains two layers, or more than two layers. For example, the second multilayer film can have two, three, four, five, six, seven, eight, nine, ten, eleven, or more layers. In an embodiment, the second multilayer film contains only two layers, or only three layers.

In an embodiment, the second film is a monolayer film with only one layer.

The second film is in contact with the first film. The second film may be in direct contact or indirect contact with the first film. In an embodiment, the second film directly contacts the first film. In another embodiment, the second film indirectly contacts the first film.

The second film has two opposing surfaces.

In an embodiment, the second film includes a layer containing a component selected from a fourth ethylene-based polymer, propylene-based polymer, polyamide (such as nylon), polyester, ethylene vinyl alcohol (EVOH) copolymer, polyethylene terephthalate (PET), ethylene vinyl acrylate copolymer, ethylene methyl acrylate copolymer, ethylene ethyl acrylate copolymer, ethylene butyl acrylate copolymer, ethylene acrylic acid copolymer, ethylene methacrylic acid copolymer, an ionomer of ethylene acrylic acid, an ionomer of methacylic acid, maleic anhydride grafted ethylene-based polymer, a polystyrene, a metal foil, and combinations thereof. In an embodiment, the second film includes a layer containing a component selected from PET, EVOH copolymer, a polyamide, and combinations thereof. In an embodiment, the second film includes a layer containing PET.

In an embodiment, the second film has a thickness from 5 µm, or 8 µm, or 10 µm, or 12 µm, or 15 µm to 20 µm, or 25 µm, or 30 µm, or 35 µm, or 40 µm, or 45 µm, or 50 µm, or 55 µm, or 60 µm, or 65 µm, or 70 µm, or 75 µm, or 80 µm, or 85 µm, or 90 µm, or 100 µm, or 150 µm.

In an embodiment, an outermost surface of the second film is an outermost surface of the laminate.

The second film may comprise two or more embodiments disclosed herein.

Optional Adhesive Layer

In an embodiment, the laminate includes an optional adhesive layer. The adhesive layer is in contact with the first film and the second film.

The adhesive layer has two opposing surfaces. In an embodiment, the adhesive layer is a continuous layer with two opposing surfaces. The adhesive layer is in contact with the first film. The adhesive layer may be in direct contact or in indirect contact with the first film. In an embodiment, the adhesive layer directly contacts the first film. In another embodiment, the adhesive layer indirectly contacts the first film.

The adhesive layer contains an adhesive. Nonlimiting examples of suitable adhesives include polyurethane adhesives, polyacrylate adhesives, and combinations thereof. Nonlimiting examples of suitable polyurethane adhesives include MOR-FREE™ 706A/C-79 (a solventless polyurethane adhesive); MOR-FREE™ 715A/CR-84 (a solvent-less polyester-based polyurethane adhesive); and MOR-FREE™ 698A/C-79 (solvent-less polyether-based polyurethane adhesive), each available from Rohm and Haas. A nonlimiting example of a suitable polyacrylate adhesive is ROBOND™ L-168/CR3A, a water-based polyacrylate adhesive available from The Dow Chemical Company.

In an embodiment, the adhesive layer has a coating weight of from 0.5 grams per square meter ($g/m^2$), or 1.0 $g/m^2$, or 1.5 $g/m^2$, or 1.8 $g/m^2$, or 1.9 $g/m^2$ to 2.0 $g/m^2$, or 2.5 $g/m^2$, or 3.0 $g/m^2$.

The adhesive layer may comprise two or more embodiments disclosed herein.

In an embodiment, the laminate has a COF at 12 m/min of less than 0.55, or from 0.01, or 0.05, or 0.10, or 0.20, or 0.25 to 0.27, or 0.28, or 0.29, or 0.30, or 0.35, or 0.40, or 0.45, or 0.49, or 0.50, or 0.54, or 0.55.

In an embodiment, the adhesive layer contains a polyether-based polyurethane adhesive and the laminate has a COF at 12 m/min from 0.10, or 0.20, or 0.30, or 0.40, or 0.45 to 0.54, or 0.55.

In an embodiment, the adhesive layer contains a polyester-based polyurethane adhesive and the laminate has a COF at 12 m/min from 0.10, or 0.20, or 0.30, or 0.40, or 0.45 to 0.49, or 0.50.

In an embodiment, the laminate includes, consists essentially of, or consists of:

a first film comprising, consisting essentially of, or consisting of
 (1) a sealant layer containing, consisting essentially of, or consisting of
  (A) from 70 wt %, or 75 wt %, or 80 wt %, or 85 wt %, or 90 wt % to 93 wt %, or 94 wt %, or 95 wt %, or 96 wt %, or 97 wt %, or 98 wt %, or 99 wt %, or 99.9 wt % ethylene-based polymer (such as an ethylene plastomer/elastomer, a LDPE, a LLDPE, or combinations thereof), based on the total weight of the sealant layer;
  (B) from 0.1 wt %, or 0.2 wt %, or 0.3 wt %, or 0.4 wt %, or 0.5 wt %, or 1.0 wt %, or 1.5 wt %, or 1.8 wt % to 2.0 wt %, or 2.3 wt %, or 2.5 wt %, or 2.8 wt %, or 3.0 wt %, or 3.5 wt %, or 4.0 wt %, or 4.5 wt %, or 5.0 wt % slip agent blend, based on the total weight of the sealant layer; and
  (C) optionally, from 0 wt %, or 0.01 wt %, or 0.05 wt %, or 0.1 wt %, or 0.2 wt % to 0.3 wt %, or 0.4 wt %, or 0.5 wt %, or 1.0 wt %, or 2.0 wt %, or 3.0 wt %, or 4.0 wt %, or 5.0 wt % additive, based on the total weight of the sealant layer; and the slip agent blend contains:
   (i) from 1 wt %, or 5 wt %, or 10 wt %, or 15 wt %, or 20 wt % to 25 wt %, or 30 wt %, or 35 wt %, or 40 wt %, or 45 wt %, or 49 wt %, or less than 50 wt % of a first PDMS (such as a dimethylhydroxysilyl terminated PDMS) having a Mn from 30,000 g/mol, or 40,000 g/mol, or 45,000 g/mol, or 48,000 g/mol to 49,000 g/mol, or 50,000 g/mol, or 55,000 g/mol, or 60,000 g/mol, or 65,000 g/mol, or 70,000 g/mol, or 75,000 g/mol, or 80,000 g/mol, or 90,000 g/mol, or 100,000 g/mol, or 150,000 g/mol, or 200,000 g/mol, or 250,000 g/mol, based on the total weight of the slip agent blend; and
   (ii) from greater than 50 wt %, or 51 wt %, or 55 wt %, or 60 wt %, or 65 wt %, or 70 wt %, or 75 wt % to 80 wt %, or 85 wt %, or 90 wt %, or 95 wt %, or 99 wt % of a second PDMS (such as a dimethylvinylsilyl terminated PDMS) having a Mn from 300,000 g/mol, or 320,000 g/mol, or 330,000 g/mol, or 340,000 g/mol, or 350,000 g/mol to 360,000 g/mol, or 370,000 g/mol, or 380,000 g/mol, or 390,000 g/mol, or 400,000 g/mol, or 450,000 g/mol, or 500,000 g/mol, or 550,000 g/mol, or 600,000 g/mol, or 750,000 g/mol, or 1,000,000 g/mol, based on the total weight of the slip agent blend;
 (2) optionally, a core layer in contact with the sealant layer, the core layer containing a second ethylene-based polymer (such as LLDPE, LDPE, or a combination thereof) and, optionally, an additive;
 (3) optionally, a release layer in contact with the core layer, the release layer containing a third ethylene-based polymer (such as LLDPE, LDPE, or a combination thereof) and, optionally, an additive;
a second film comprising a layer containing a component selected from PET, EVOH copolymer, a polyamide, or a combination thereof; and
optionally, an adhesive layer containing an adhesive (such as a polyurethane adhesive) in contact with the first film and the second film; and
the laminate has one, some, or all of the following properties:
 (i) the sealant layer has a thickness from 5 μm, or 7 μm, or 10 μm to 15 μm, or 20 μm, or 25 μm, or 30 μm, or 35 μm, or 40 μm, or 45 μm, or 50 μm; and/or
 (ii) the sealant layer is from 10 vol %, or 15 vol %, or 20 vol % to 25 vol %, or 30 vol %, or 40 vol %, or 50 vol %, or 60 vol %, or 70 vol %, or 80 vol %, or 90 vol %, or 95 vol % of the first film, based on the total volume of the first film; and/or
 (iii) the core layer has a thickness from 5 μm, or 8 μm, or 10 μm, or 15 μm, or 20 μm, or 25 μm, or 30 μm to 35 μm, or 40 μm, or 45 μm, or 50 μm, or 55 μm, or 60 μm, or 70 μm, or 80 μm; and/or
 (iv) the core layer is from 10 vol %, or 15 vol %, or 20 vol %, or 25 vol %, or 30 vol %, or 40 vol %, or 50 vol %, or 60 vol % to 65 vol %, or 70 vol %, or 80 vol %, or 90 vol % of the first film, based on the total volume of the first film; and/or
 (v) the release layer has a thickness from 5 μm, or 8 μm, or 10 μm to 15 μm, or 20 μm, or 25 μm, or 30 μm, or 35 μm, or 40 μm, or 45 μm, or 50 μm; and/or
 (vi) the release layer is from 10 vol %, or 15 vol %, or 20 vol % to 25 vol %, or 30 vol %, or 40 vol %, or 50 vol %, or 60 vol %, or 70 vol %, or 80 vol %, or 90 vol %, or 95 vol % of the first film, based on the total volume of the first film; and/or
 (vii) the first film has a thickness of from 15 μm, or 20 μm, or 30 μm, or 40 μm, or 50 μm to 60 μm, or 65 μm, or 70 μm, or 75 μm, or 80 μm, or 85 μm, or 90 μm, or 95 μm, or 100 μm; and/or
 (viii) the second film has a thickness from 5 μm, or 8 μm, or 10 μm, or 12 μm, or 15 μm to 20 μm, or 25 μm, or 30 μm, or 35 μm, or 40 μm, or 45 μm, or 50 μm; and/or
 (ix) the outermost surface of the sealant layer is an outermost surface of the laminate; and/or (x) the laminate has a COF at 12 m/min from 0.01, or 0.05, or 0.10, or 0.20, or 0.25 to 0.27, or 0.28, or 0.29, or 0.30, or 0.35, or 0.40, or 0.45, or 0.49, or 0.50, or 0.54, or 0.55.

It is understood that the sum of the components in each of the layers disclosed herein, including the foregoing layers, yields 100 weight percent (wt %), based on the total weight of the respective layer. It is also understood that the sum of the volume of each of the layers disclosed herein, including the foregoing layers, yields 100 volume percent (vol %), based on the total volume of the respective film.

In an embodiment, the laminate has the following Structure (III):

first film/adhesive layer/second film    Structure(III).

In an embodiment, the first film is a multilayer film with a sealant layer, a core layer, and a release layer; and the second film is a monolayer film containing PET; and the laminate has the following Structure (IV):

sealant layer/core layer/release layer/adhesive layer/
second film    Structure(IV).

In an embodiment, the laminate includes from 1 to 10 repeating layers of the adhesive layer and the second film, wherein each adhesive layer may be the same or different than the other adhesive layer(s) and each second film may be the same or different than the other second film(s). In a further embodiment, the laminate has the following Structure (V):

first film/adhesive layer/second film/adhesive layer/
second film    Structure (V).

The laminate may comprise two or more embodiments disclosed herein.

The present disclosure also provides an article containing the laminate, as a package. Nonlimiting examples of suitable packages include food packages and specialty packages (e.g., stand-up pouches, pillow pouches, and trays wrapped in film).

In an embodiment, the article is a pillow pouch. In an embodiment, the pillow pouch includes a single sheet of the laminate that is folded upon itself. The three unconnected edges are then heat sealed after the contents are placed between the folded-over layers. The heat seals include a top seal, a bottom seal, and a center fold seal. A storage space is defined by the area between the folded sheet and within the heat seals. The storage space is sealed off from the surrounding environment and contains the contents, of the pouch, for example, foodstuffs. In an embodiment, the pillow pouch is a hermetic pouch. While the package is described as having a single sheet, it should be readily apparent to those skilled in the art that more than one sheet could be used. In an embodiment, the pillow pouch is formed on a vertical form fill seal (VFFS) line. In an embodiment, the pillow pouch is formed on a VFFS line that forms greater than 90 hermetic pouches per minute (p-p-m), or from 100 p-p-m, or 120 p-p-m, or 130 p-p-m, or 140 p-p-m, or 150 p-p-m, or 160 p-p-m to 170 p-p-m, or 180 p-p-m, or 190 p-p-m, or 200 p-p-m.

The article may comprise two or more embodiments disclosed herein.

By way of example, and not limitation, some embodiments of the present disclosure will now be described in detail in the following Examples.

EXAMPLES

Materials used in the examples are provided in Table 1 below.

TABLE 1

| Material/Description | Properties | Source |
|---|---|---|
| AFFINITY ™ PL 1880G (ethylene/1-octene copolymer) (plastomer/elastomer) | MI (I2)(190° C./2.16 kg) = 1.0 g/10 min, Density = 0.902 g/cc, Melting point = 99° C. | The Dow Chemical Company |
| AFFINITY ™ PL 1881G (750 ppm fatty acid amide slip agent and 2500 ppm silica antiblock agent dispersed in an ethylene/α-olefin copolymer (plastomer/elastomer)) | MI (I2)(190° C./2.16 kg) = 1.0 g/10 min, Density = 0.904 g/cc, Melting point = 100° C. | The Dow Chemical Company |
| DOWLEX ™ NG 5056G (ethylene/1-octene copolymer) (LLDPE) | MI (I2)(190° C./2.16 kg) = 1.1 g/10 min, Density = 0.919 g/cc | The Dow Chemical Company |
| DOW ™ LDPE 320E (LDPE) | MI (I2)(190° C./2.16 kg) = 1.0 g/10 min, Density = 0.923 g/cc | The Dow Chemical Company |
| DOW ™ LDPE 312E (900 ppm antiblock agent and 385 ppm slip agent dispersed in a LDPE (ethylene homopolymer)) | MI (I2)(190° C./2.16 kg) = 0.75 g/10 min, Density = 0.9235 g/cc | The Dow Chemical Company |
| MB25-502 Masterbatch (25 wt % dimethylhydroxysilyl terminated PDMS (PDMS A) dispersed in LDPE A) | LDPE A MI (I2)(190° C./2.16 kg) = 8.0 g/10 min, PDMS A Mn = 48,400 g/mol, PDMS A Mw = 120,100 g/mol, PDMS A Mw/Mn = 2.48 | Dow Corning |
| MB25-635 Masterbatch (25 wt % dimethylvinylsilyl terminated PDMS (PDMS B) dispersed in LDPE B)) | LDPE B MI (I2)(190° C./2.16 kg) = 2.5 g/10 min, PDMS B Mn = 356,700 g/mol[1], PDMS B Mw = 647,266 g/mol[1], PDMS B Mw/Mn = 1.82[1] | Dow Corning |
| MB25-035 Masterbatch (25 wt % dimethylvinylsilyl terminated PDMS (PDMS C) dispersed in LDPE C) | LDPE C MI (I2)(190° C./2.16 kg) = 2.3 g/10 min, PDMS C Mn = 356,700 g/mol[1], PDMS C Mw = 647,266 g/mol[1], PDMS C Mw/Mn = 1.82[1] | Dow Corning |
| MB50-613 Masterbatch | LLDPE E MI (I2)(190° C./2.16 kg) = 6.0 g/10 min, PDMS D Mn = 356,700 g/mol[1], | Dow Corning |

TABLE 1-continued

| Material/Description | Properties | Source |
|---|---|---|
| (50 wt % dimethylvinylsilyl terminated PDMS (PDMS D) dispersed in LLDPE E) | PDMS D Mw = 647,266 g/mol[1], PDMS D Mw/Mn = 1.82[1] | |
| ME 50024 Masterbatch (62.5 wt % talc dispersed in LDPE D) | LDPE D MI (I2)(190° C./2.16 kg) = 20 g/10 min | Multibase S.A. |
| MOR-FREE ™ 715A/CR-84 (weight ratio of 100:50) | solvent-less polyester-based polyurethane adhesive | Rohm and Haas |
| MOR-FREE ™ 698A/MOR-FREE ™ C-79 (weight ratio of 100:45) | solvent-less polyether-based polyurethane adhesive | Rohm and Haas |

[1]Based on the average of three samples.

Multilayer film samples are fabricated on an Alpine coextrusion line with the following conditions: average film thickness=50 µm; Blow Up Ratio (B.U.R.)=2.5; Die Diameter=200 mm; Die Gap=2.5 mm; Temperature profile-Extruder A=150 170 225 225 220 220° C.; Temperature profile-Extruder B=200 235 240 240 240 235° C.; Temperature profile-Extruder C=200-235-245-240-240-240° C.; Temperature, Die=220° C.; Corona Treatment=40 dyne; Output Rate=120 kg/h; and Layer Distribution Ratio=15:70:15 (A:B:C). The film bubble is open and cut to a 40 cm wide film roll.

The layer configurations are provided below in Table 2. Each multilayer film structure is formed with (A) a sealant layer having a volume that is 15 volume % of the multilayerfilm, (B) a core layer having a volume that is 70 volume % of the multilayer film, and (C) a release layer having a volume that is 15 volume % of the multilayer film. The multilayer film has the following structure: sealant layer (A)/core layer (B)/release layer (C). The sealant layer is in direct contact with the core layer, and the core layer is in direct contact with the release layer. In Table 2, "CS" refers to Comparative Sample.

Each PDMS is included in the sealant layer as part of a masterbatch (MB25-502, MB25-635, MB25-035, or MB50-613) in which the PDMS is dispersed in a LDPE matrix or a LLDPE matrix. Table 2 provides the individual amounts of each PDMS and LDPE/LLDPE matrix included in the sealant layer. For example, the sealant layer of Film Example 1 includes 0.5 wt % of the PDMS A from MB25-502 (which has a Mn of 48,400 g/mol, as provided in Table 1) and 1.5 wt % of the LDPE A from MB25-502, based on the total weight of the sealant layer. Thus, the sealant layer of Film Example 1 contains a total amount of 2.0 wt % MB25-502, based on the total weight of the sealant layer. The sealant layer of Film Example 1 also includes 1.5 wt % of the PDMS B from MB25-635 (which has a Mn of 356,700 g/mol, as provided in Table 1) and 4.5 wt % of the LDPE B from MB25-635, based on the total weight of the sealant layer. Thus, the sealant layer of Film Example 1 contains a total amount of 6.0 wt % MB25-635, based on the total weight of the sealant layer The multilayer film samples are tested for COF. The results are provided below in Table 2.

TABLE 2

Multilayer Film Samples

| | Film Ex. 1 | Film CS 2 | Film Ex. 3 | Film Ex. 4 | Film Ex. 5 | Film CS 6 | Film Ex. 7 | Film Ex. 8 | Film Ex. 9 |
|---|---|---|---|---|---|---|---|---|---|
| Sealant Layer (A) (15 vol %) | | | | | | | | | |
| AFFINITY ™ PL 1880G (wt %)[A] | 91.5 | — | 91.5 | 91.58 | 93.5 | 91.5 | 93.5 | 95.75 | 95.9 |
| AFFINITY ™ PL 1881G (wt %)[A] (includes 0.075 wt %[D] fatty acid amide and 0.25 wt %[D] silica) | — | 100 | — | — | — | — | — | — | — |
| LDPE A (wt %)[A] (from MB25-502) | 1.5 | — | 1.5 | 1.5 | 1.125 | 6.0 | 1.125 | 1.125 | 0.9 |
| LDPE B (wt %)[A] (from MB25-635) | 4.5 | — | — | — | — | — | 3.375 | — | — |
| LDPE C (wt %)[A] (from MB25-035) | — | — | 4.5 | 4.5 | 3.375 | — | — | — | — |
| LDPE D (wt %)[A] (from ME 50024) | 0.1875 | — | 0.1875 | 0.1575 | 0.1875 | 0.1875 | 0.1875 | 0.1875 | 0.1875 |
| LLDPE E (wt %)[A] (from MB50-613) | — | — | — | — | — | — | — | 1.125 | 1.2 |
| PDMS A (wt %)[A] (from MB25-502) | 0.5 | — | 0.5 | 0.5 | 0.375 | 2.0 | 0.375 | 0.375 | 0.3 |
| PDMS B (wt %)[A] (from MB25-635) | 1.5 | — | — | — | — | — | 1.125 | — | — |
| PDMS C (wt %)[A] (from MB25-035) | — | — | 1.5 | 1.5 | 1.125 | — | — | — | — |
| PDMS D (wt %)[A] (from MB50-613) | — | — | — | — | — | — | — | 1.125 | 1.2 |
| Talc (wt %)[A] (from ME 50024) | 0.3125 | — | 0.3125 | 0.2625 | 0.3125 | 0.3125 | 0.3125 | 0.3125 | 0.3125 |
| Total (wt %)[A] | 100 | 100 | 100 | 100 | 100 | 100 | 100 | 100 | 100 |
| Core Layer (B) (70 vol %) | | | | | | | | | |
| DOWLEX ™ NG 5056G (wt %)[B] | 70 | 70 | 70 | 70 | 70 | 70 | 70 | 70 | 70 |
| DOW ™ LDPE 312E (wt %)[B] (includes 0.0385 wt %[E] slip agent and 0.09 wt %[E] antiblock agent) | 30 | 30 | 30 | 30 | 30 | 30 | 30 | 30 | 30 |
| Total (wt %)[B] | 100 | 100 | 100 | 100 | 100 | 100 | 100 | 100 | 100 |

TABLE 2-continued

Multilayer Film Samples

|  | Film Ex. 1 | Film CS 2 | Film Ex. 3 | Film Ex. 4 | Film Ex. 5 | Film CS 6 | Film Ex. 7 | Film Ex. 8 | Film Ex. 9 |
|---|---|---|---|---|---|---|---|---|---|
| Release Layer (15 vol %) | | | | | | | | | |
| DOWLEX™ NG 5056G (wt %)$^C$ | 70 | 70 | 70 | 70 | 70 | 70 | 70 | 70 | 70 |
| DOW™ LDPE 320E (wt %)$^C$ | 30 | 30 | 30 | 30 | 30 | 30 | 30 | 30 | 30 |
| Total (wt %)$^C$ | 100 | 100 | 100 | 100 | 100 | 100 | 100 | 100 | 100 |
| Film Thickness (μm) | 50 | 50 | 50 | 50 | 50 | 50 | 50 | 50 | 50 |
| Sealant Layer Slip Agent Blend | | | | | | | | | |
| total wt % slip agent blend$^+$ | 2.0 | 0 | 2.0 | 2.0 | 1.5 | 2.0 | 1.5 | 1.5 | 1.5 |
| wt % "low Mn" PDMS$^-$ | 25 | 0 | 25 | 25 | 25 | 100 | 25 | 25 | 20 |
| wt % "high Mn" PDMS$^=$ | 75 | 0 | 75 | 75 | 75 | 0 | 75 | 75 | 80 |
| Sealant Layer COF at 100 mm/min$^\diamond$ | 0.39 | 0.32 | 0.17 | 0.30 | 0.21 | 0.36 | 0.34 | 0.29 | 0.25 |
| Sealant Layer COF at 12 m/min$^\square$ | 0.21 | 0.52 | NM | NM | NM | NM | 0.21 | 0.23 | 0.24 |

$^A$wt % based on the total weight of the Sealant Layer.
$^B$wt % based on the total weight of the Core Layer.
$^C$wt % based on the total weight of the Release Layer.
$^D$wt % based on the total weight of AFFINITY™ PL 1881G.
$^E$wt % based on the total weight of DOW™ LDPE 312E.
$^\diamond$Sealant Layer COF at 100 mm/min is measured according to ISO 8295.
$^+$Total wt % slip agent refers to the total amount of slip agent present in Sealant Layer, based on the total weight of the Sealant Layer.
$^-$wt % of PDMS with a Mn from 30,000 g/mol to less than 300,000 g/mol, based on the total weight of slip agent in the Sealant Layer.
$^=$wt % of PDMS with a Mn from 300,000 g/mol to 2,000,000 g/mol, based on the total weight of slip agent in the Sealant Layer.
$^\square$Sealant Layer COF at 12 m/min is measured on an "at-line" COF testing apparatus.

The multilayer film samples of Table 2 are laminated to a PET film (12 μm thick) with an adhesive via a Labo Combi™ L400 laminator (a pilot coater) from Nordmeccanica Group. During lamination, the multilayer film samples of Table 2 are placed on a first tape reel, which is placed on a first unwinder having a tension of 1.7 kg and the PET film is placed an a second tape reel, which is placed on a second unwinder having a tension of 2 kg. The laminator is equipped with three chromium-plated steel rollers heated at 45° C. The PET film is coated with the adhesive as it is unwound from the first unwinder by pouring the adhesive between batch rollers. The adhesive is applied to the PET film with a coating weight of 1.9 g/m². The adhesive-coated PET film is then pressed against the multilayer film sample as it is unwound from the second unwinder via a laminating calender and a compressing roller. The speed of the laminator is 100 m/min, the nip temperature is 50° C., and the pressure is 3 bar (300 kiloPascal (kPa)). The laminated structure is then wound on a winder shaft having a tension of 4 kg. The laminated structures are cured for 6 days at room temperature (23° C.). The resulting laminates have the following Structure (A): multilayer film sample/adhesive layer/PET film. In other words, the resulting laminates have the following Structure (A): sealant layer/core layer/release layer/adhesive layer/PET film. The laminated structure configurations are provided below in Table 3.

The laminate structures are tested for COF. The results are provided below in Table 3.

TABLE 3

Laminates of Structure (A) (multilayer film sample/adhesive layer/PET film)

|  | CS 10 | CS 15 | Ex. 12 | Ex. 13 | Ex. 14 | CS 17 | Ex. 18 | Ex. 19 |
|---|---|---|---|---|---|---|---|---|
| Multilayer Film sample$^A$ | Film CS 2 | Film CS 2 | Film Ex. 7 | Film Ex. 8 | Film Ex. 9 | Film CS 2 | Film Ex. 1 | Film Ex. 7 |
| Adhesive Layer$^B$ | 698A/C-79 | 698A/C-79 | 698A/C-79 | 698A/C-79 | 698A/C-79 | 715A/CR-84 | 715A/CR-84 | 715A/CR-84 |
| PET Film | PET Film | PET Film | PET Film | PET Film | PET Film | PET Film | PET Film | PET Film |
| Laminate COF at 12 m/min$^\square$ | 0.56 | 0.56 | 0.50 | 0.54 | 0.49 | 0.52 | 0.48 | 0.49 |
| Hermetic Pouches/min. (p-p-m) | 0 | 90$^C$ | 170 | NM | NM | 0 | 170 | 170 |
| Percentage of Hermicity (%) | N/A | 100$^C$ | 100 | NM | NM | N/A | 100 | 100 |

$^A$Multilayer Film Samples of Table 2
$^B$715A/CR-84 = MOR-FREE™ 715A/CR-84 698A/C-79 = MOR-FREE™ 698A/MOR-FREE™ C-79
$^C$CS 15 pouches are prepared on a VFFS line equipped with Nitoflon™ adhesive tape around the center block of the feeding unit.
$^\square$Laminate COF at 12 m/min is measured on an "at-line" COF testing apparatus.
NM = not measured Applicant surprisingly found that laminates (Ex. 12-Ex. 19) with a PET film, an adhesive layer, and a sealant layer containing (A) an ethylene-based polymer (AFFINITY™ PL 1880G and LDPE or LLDPE) and (B) a slip agent blend, the slip agent blend containing (i) a first PDMS having a Mn from 30,000 g/mol to less than 300,000 g/mol (PDMS A); and (ii) a second PDMS having a Mn from 300,000 g/mol to 2,000,000 g/mol (PDMS B, PDMS C, PDMS D) advantageously exhibit a lower laminate COF at 12 m/min (<0.56 for laminates with an adhesive layer containing MOR-FREE™ 698A/MOR-FREE™ C-79)(<0.52 for laminates with an adhesive layer containing MOR-FREE™ 715A/CR-84) than comparative laminates (CS 10, CS 15, CS 17) including the same PET film and adhesive layer, but with a sealant layer containing (A) an ethylene-based polymer (AFFINITY™ PL 1880G and LDPE) and (B) a single slip agent (Film CS 2)—rather than a slip agent blend.

The laminated structures are then formed into pillow pouches on a Bosch™ vertical form fill seal (VFFS) line (Model SVE 2520 WR). The VFFS line is a continuous motion vertical bagger. For CS 15, the VFFS line is equipped with a Nitoflon™ adhesive tape from Nito Denko around the center block of the feeding unit to reduce the friction between the sealant layer of the laminate and the metal center feeding block of the VFFS line. The pillow pouch is formed from a single piece of laminate folded upon itself and heat sealed to form a top seal, a bottom seal, and a centerfold seal. The pillow pouch has a length of 230 mm and a width of 150 mm. The seal bar temperatures are set at 180° C., with a seal time of 50 milliseconds and a pressure of 2.5 kNewton. The speed of the VFFS line is measured as the number of hermetic pouches formed per minute (p-p-m). No filling goods are used during testing. The results are provided above in Table 3.

The hermicity of the pillow pouches is tested by placing 10 pillow pouches under water in a closed tank, in which a vacuum is applied at 0.6 bar (60 kPa). After 30 seconds, the pillow pouches are visually inspected. A pillow pouch is considered hermetic if no bubbles come out of the pillow pouch. A pillow pouch is considered non-hermetic if bubbles come out of the pillow pouch. The percentage of hermicity is the percentage of pillow pouches that are found hermetic. Results are recorded in Table 3.

As shown in Table 3, pillow pouches made from comparative laminates including a sealant layer containing (A) an ethylene-based polymer (AFFINITY™ PL 1880G and LDPE) and (B) a single slip agent (Film CS 2)—rather than a slip agent blend—(i) cannot be formed (CS 10 and CS 17) or (ii) are formed at a slow speed (i.e., <100 p-p-m) (CS 15).

Applicant surprisingly found that pillow pouches formed from laminates including a sealant layer containing (A) an ethylene-based polymer (AFFINITY™ PL 1880G and LDPE or LLDPE) and (B) a slip agent blend, the slip agent blend containing (i) a first PDMS having a Mn from 30,000 g/mol to less than 300,000 g/mol (PDMS A); and (ii) a second PDMS having a Mn from 300,000 g/mol to 2,000,000 g/mol (PDMS B, PDMS C, or PDMS D) are advantageously hermetic pillow pouches that may be formed at the maximum speed of the VFFS line (170 p-p-m).

It is specifically intended that the present disclosure not be limited to the embodiments and illustrations contained herein, but include modified forms of those embodiments including portions of the embodiments and combinations of elements of different embodiments as come within the scope of the following claims.

We claim:
1. A laminate of comprising:
   (1) a coextruded multilayer film consisting of a sealant layer, a core layer, and a release layer the sealant layer consisting of
      (A) one or more first ethylene-based polymers consisting of (i) ethylene monomer and (ii) optional $C_3$-$C_{10}$ α-olefin comonomer;
      (B) a slip agent blend consisting of
         (i) from 1 wt % to less than 50 wt % of a first polydimethylsiloxane (PDMS) having a Mn from 30,000 g/mol to less than 50,000 g/mol;
         (ii) from greater than 50 wt % to 99 wt % of a second PDMS having a Mn from 300,000 g/mol to 550,000 g/mol;
      (C) optional first additives;
   the core layer in contact with the sealant layer, the core layer consisting of a second ethylene-based polymer selected from the group consisting of a linear low density polyethylene (LLDPE), a low density polyethylene (LDPE), and combinations thereof; and optionally up to 5.0 wt % of second additives, based on the weight of the core layer;
   the release layer in contact with the core layer, the release layer consisting of a third ethylene-based polymer selected from the group consisting of a linear low density polyethylene (LLDPE), a low density polyethylene (LDPE), and combinations thereof, and optionally up to 5.0 wt % of third additives, based on the weight of the release layer;
   (2) an adhesive layer that is a single layer in direct contact with the release layer and a second film; and
   (3) the second film comprising a layer comprising polyethylene terephthalate (PET), ethylene vinyl alcohol (EVOH) copolymer, a polyamide, or a combination thereof;
   wherein each ethylene-based polymer in the coextruded multilayer film has a density from 0.87 g/cc to 0.93 g/cc.

2. The laminate of claim 1 wherein the one or more first ethylene-based polymers is selected from the group consisting of (i) an ethylene plastomer/elastomer having a density from 0.870 g/cc to 0.917 g/cc, (ii) a low density polyethylene (LDPE) having a density from 0.915 g/cc to 0.930 g/cc, (iii) a linear low density polyethylene (LLDPE) having a density from 0.910 g/cc to 0.930 g/cc, and (iv) combinations thereof.

3. The laminate of claim 1 wherein the one or more first ethylene-based polymers of the sealant layer is
   an ethylene plastomer/elastomer having a density from 0.870 g/cc to 0.917 g/cc;
   a first low density polyethylene having a density from 0.915 g/cc to 0.930 g/cc; and
   a second low density polyethylene having a density from 0.915 g/cc to 0.930 g/cc wherein the second low density polyethylene is different than the first low density polyethylene.

4. The laminate of claim 3 wherein the sealant layer is in direct contact with the core layer and the core layer is in direct contact with the release layer.

5. The laminate of claim 4 wherein the first additive is present and the first additive is selected from the group consisting of antiblock agents, antioxidants, antistatic agents, stabilizing agents, nucleating agents, colorants, pigments, ultra violet (UV) absorbers, stabilizers, flame retardants, compatibilizers, plasticizers, fillers, processing aids, antifog additive, crosslinking agents, and combinations thereof.

6. The laminate of claim 5 wherein the laminate has five layers.

7. The laminate of claim 1
wherein an outermost surface of the sealant layer is an outermost surface of the laminate and the sealant layer has a coefficient of friction at 12 m/min of from 0.01 to 0.55 as measured using an at line COF testing apparatus according to $T_2 = T_1 e^{\mu\beta}$, wherein $T_1$ is the tension of a sample before wrapping around a 304 stainless steel static roller, $T_2$ is a tension of the sample after wrapping around the static roller, $\mu$ is the coefficient of friction, and $\beta$ is a 0.52 radians wrap angle across the static roller surface.

8. The laminate of claim 1, wherein the slip agent blend consists of:
   (i) from 1 wt % to less than 50 wt % of the first PDMS is a dimethylhydroxysilyl terminated PDMS; and
   (ii) from greater than 50 wt % to 99 wt % of the second PDMS is a dimethylhydroxysilyl terminated PDMS; based on the total weight of the slip agent blend.

9. The laminate of claim 8, wherein the sealant layer comprises from 0.1 wt % to 5.0 wt % of the slip agent blend, based on the total weight of the sealant layer.

10. The laminate of claim 9, wherein the sealant layer comprises:
    (i) from 0.20 wt % to 0.5 wt % of the first PDMS; and
    (ii) from 1.0 wt % to 1.5 wt % of the second PDMS, based on the total weight of the sealant layer.

11. The laminate of claim 1, wherein the one or more first ethylene-based polymers consist of an ethylene plastomer/elastomer and a low density polyethylene (LDPE).

12. The laminate of claim 10, wherein the second film is a monolayer film.

13. The laminate of claim 12, wherein the second film comprises polyethylene terephthalate (PET).

14. The laminate of claim 1, wherein the adhesive layer comprises an adhesive selected from the group consisting of a polyether adhesive, a polyurethane adhesive, or a combination thereof.

15. The laminate of claim 7, wherein the adhesive layer comprises a polyether-based polyurethane adhesive and the coefficient of friction is from 0.20 to 0.55.

16. The laminate of claim 13, wherein the adhesive layer comprises a polyester-based polyurethane adhesive.

* * * * *